(12) United States Patent
Hassan

(10) Patent No.: US 11,799,814 B1
(45) Date of Patent: Oct. 24, 2023

(54) SIDEBAR COMMUNICATION THREADS

(71) Applicant: Microsoft Technology Licensing, LLC, Redmond, WA (US)

(72) Inventor: Amer Aref Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/836,627

(22) Filed: Jun. 9, 2022

(51) Int. Cl.
*H04L 51/216* (2022.01)
*H04L 51/046* (2022.01)
*H04L 51/224* (2022.01)

(52) U.S. Cl.
CPC .......... *H04L 51/216* (2022.05); *H04L 51/046* (2013.01); *H04L 51/224* (2022.05)

(58) Field of Classification Search
None
See application file for complete search history.

(56) References Cited

U.S. PATENT DOCUMENTS

| | | | |
|---|---|---|---|
| 6,668,284 B1 * | 12/2003 | Parkhurst | G06F 9/546 719/313 |
| 6,823,363 B1 | 11/2004 | Noveck et al. | |
| 7,328,242 B1 | 2/2008 | Mccarthy et al. | |
| 7,346,654 B1 | 3/2008 | Weiss et al. | |
| 10,805,247 B1 | 10/2020 | Cohen et al. | |
| 11,201,843 B1 * | 12/2021 | Agarwal | H04L 51/42 |
| 11,388,120 B2 | 7/2022 | Cohen | |
| 2009/0083380 A1 | 3/2009 | Smyth et al. | |
| 2009/0112782 A1 | 4/2009 | Cross | |
| 2010/0017483 A1 | 1/2010 | Estrada | |
| 2010/0306676 A1 * | 12/2010 | Srinivasaraghavan | G06Q 10/10 709/227 |
| 2012/0079041 A1 * | 3/2012 | Vuong | H04L 51/216 709/206 |
| 2012/0260195 A1 | 10/2012 | Hon et al. | |
| 2014/0096034 A1 | 4/2014 | Blair | |

(Continued)

OTHER PUBLICATIONS

U.S. Appl. No. 17/836,586, filed Jun. 9, 2022.

(Continued)

*Primary Examiner* — Chris Parry
*Assistant Examiner* — Abderrahmen Chouat
(74) *Attorney, Agent, or Firm* — Schwegman Lundberg & Woessner, P.A.

(57) ABSTRACT

Disclosed are methods, systems, devices, and machine-readable mediums which provide for sidebar communication threads forked from, or related to, a principal thread. Messages in the sidebar communication thread may include a history of the principal thread, including one or more messages from the principal thread, and may include a proposed principal thread message that is the subject of the sidebar thread discussion. The sidebar thread may also include sidebar thread messages that carries the conversation of the sidebar thread participants. Once a termination condition is reached for the sidebar thread, the sidebar thread terminates and either the proposed principal thread message (as potentially modified by participants of the sidebar thread) becomes an accepted principal thread message and it is posted to the principal thread as if it was sent by the sidebar initiator or no message is posted (e.g., the proposed principal thread message is rejected).

20 Claims, 24 Drawing Sheets

(56) References Cited

U.S. PATENT DOCUMENTS

| | | | |
|---|---|---|---|
| 2017/0054664 A1 | 2/2017 | Lee et al. | |
| 2017/0272388 A1* | 9/2017 | Bern | H04L 51/56 |
| 2018/0006979 A1 | 1/2018 | Barsness et al. | |
| 2018/0095940 A1* | 4/2018 | Meixner | H04L 51/046 |
| 2018/0183619 A1* | 6/2018 | Jayaram | H04L 63/10 |
| 2018/0302357 A1 | 10/2018 | Cohen | |
| 2018/0359292 A1 | 12/2018 | Chen et al. | |
| 2019/0238489 A1 | 8/2019 | Cohen | |
| 2019/0327198 A1* | 10/2019 | Connor | H04L 51/216 |
| 2020/0396095 A1* | 12/2020 | Gorny | G06F 16/3329 |
| 2021/0044551 A1 | 2/2021 | Cohen et al. | |
| 2021/0117213 A1 | 4/2021 | Chen et al. | |
| 2022/0109707 A1 | 4/2022 | Butterfield et al. | |
| 2022/0353129 A1 | 11/2022 | Soman | |
| 2023/0050511 A1 | 2/2023 | Michelsen | |
| 2023/0094375 A1 | 3/2023 | Cohen et al. | |

OTHER PUBLICATIONS

U.S. Appl. No. 17/836,643, filed Jun. 9, 2022.
U.S. Appl. No. 17/836,745, filed Jun. 9, 2022.
"Non-Final Office Action Issued in U.S. Appl. No. 17/836,745", dated May 25, 2023, 20 Pages.
"Notice of Allowance Issued in U.S. Appl. No. 17/836,643", dated Jul. 6, 2023, 18 Pages.
"International Search Report and Written Opinion Issued in PCT Application No. PCT/US23/019700", dated Jun. 29, 2023, 17 Pages.
"International Search Report and Written Opinion issued in PCT Application No. PCT/US23/019032", dated Jul. 1, 2023, 15 Pages.
"International Search Report and Written Opinion issued in PCT Application No. PCT/US23/019033", dated Jul. 1, 2023, 18 Pages.
"International Search Report and Written Opinion issued in PCT Application No. PCT/US23/019034", dated Aug. 1, 2023, 16 Pages.

\* cited by examiner

TO — JAMES JONES; SHERRY SMITH

CC

SUBJECT — SIDEBAR RE: TEAM WEEKLY NEWSLETTER – 2022-01-10

SEND

720 — SIDEBAR START
722 — SIDEBAR END
724 — PRINCIPAL MSG START
726 — PRINCIPAL MSG END

-- AUTOMATICALLY GENERATED MESSAGE: BRAD SMTH REQUESTED YOUR INPUT. THIS EMAIL WILL BE REMOVED FROM YOUR INBOX WHEN YOU EDIT AND/OR APPROVE ←—710

*START SIDEBAR MESSAGE AREA*
ARE MY PROJECTIONS ACCURATE? ←—712

*END SIDEBAR MESSAGE AREA*
*BEGIN PROPOSED PRINCIPAL THREAD MESSAGE AREA*
ALL, I THINK THAT THE QUARTERLY SALES PROJECTION SHOULD BE ADJUSTED BY 1.2 MILLION TO ACCOUNT FOR OUR RECENT DEAL WITH FRANK SYSTEMS. ←—714
-BRAD
*END PROPOSED PRINCIPAL THREAD MESSAGE AREA*

FROM: SCOTT JAMES
SENT: 01/10/2022
TO: ⊞NEWSLETTER LIST; ○JAMES JONES; ○CHESTER MCCARTHY; ←—718

LOREM IPSUM DOLOR SIT AMET, CONSECTETUR ADIPISCING ELIT, SED DO EIUSMOD TEMPOR INCIDIDUNT UT LABORE

SIDEBAR COMMUNICATION THREADS

TECHNICAL FIELD

Embodiments pertain to sidebar communication threads. Some embodiments relate to automatic sending of a final message as a result of the sidebar communication thread.

BACKGROUND

Electronic communications including electronic mail (e-mail), chat, instant messaging, and message boards allow users to communicate using electronically transmitted and received messages. These communications may be organized into groups of one or more messages called message threads. Threads may comprise one or more related messages that relate to a same topic; have a shared set of participants; or that originated by replying, or replying all, to a same ancestor message. For example, an e-mail thread may be created by replying, or replying-all to a message. For some communication modalities, each successive message of a thread may include the contents or history of past messages in the thread. In chat rooms, each "thread" may be organized by where the message is posted. For example, each chat "room" may be dedicated to a particular topic and may be considered a particular thread. In some examples, finer categorization of messages may be provided. For example, a message board may have sections dedicated to particular categories. Within each category, each thread relates to a question, topic, or other related content within the particular category. Threads may then be started by users within a particular category by posting a new thread within that category. These threads may then be replied to by the user that started the thread or by other users.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 illustrates a sidebar thread message creation user interface with a sidebar thread message creation dialog according to some examples of the present disclosure.

DETAILED DESCRIPTION

Figure 1:
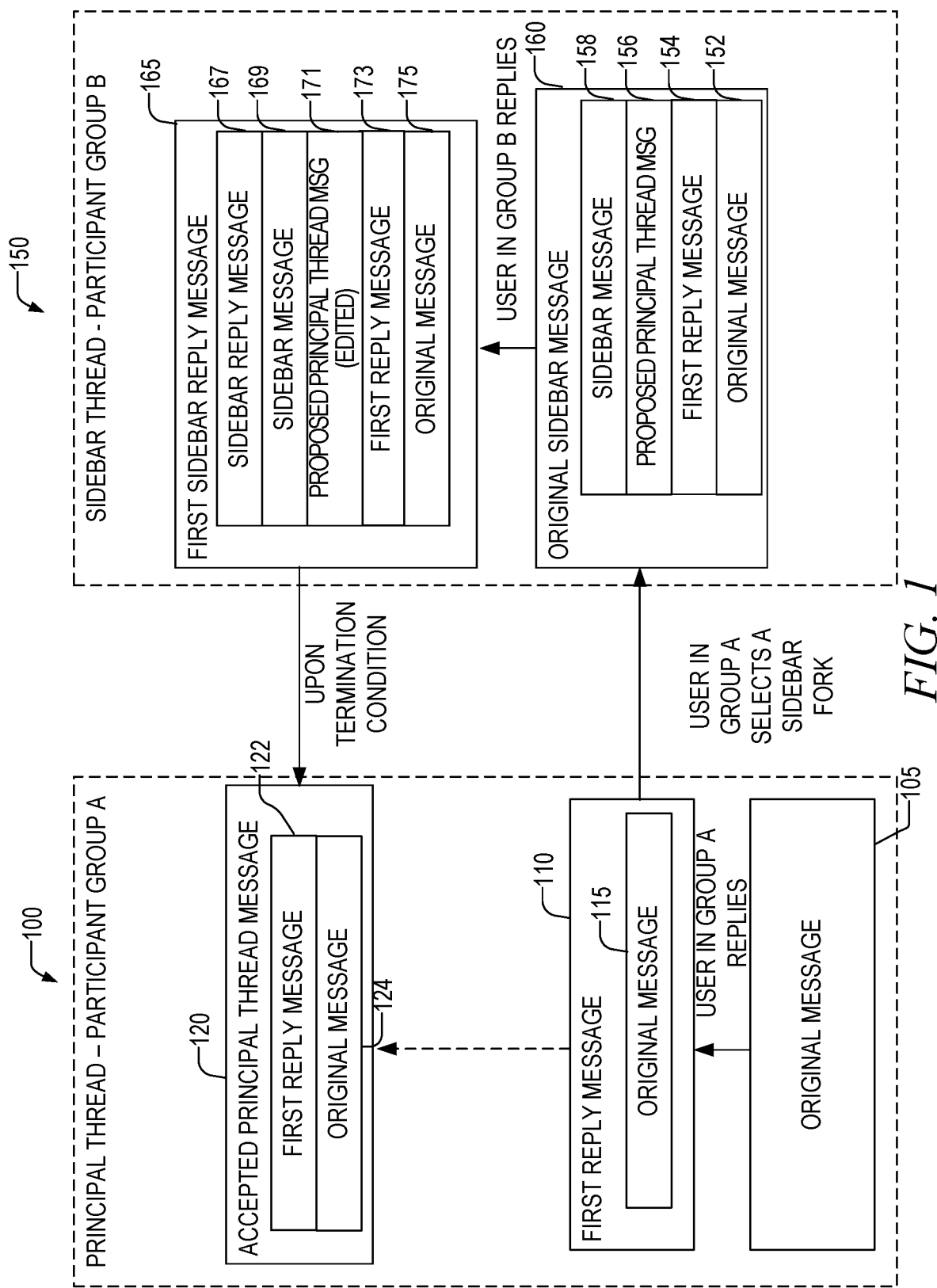
FIG. 1 illustrates an example logical diagram of a sidebar thread according to some examples of the present disclosure.

A participant of a particular message thread (hereinafter the principal thread) may wish to obtain feedback for a message that the participant is considering posting to the principal thread from other users who may or may not be participants in the principal message thread without having that feedback visible to all participants of the principal thread. For example, an employee and a customer may be discussing a product issue in the principal thread and the employee may wish to have their boss approve the posting to the principal thread prior to posting it. Typically, the employee would forward the email to their boss and include their proposed message. The boss would then approve the post, edit the proposed post, or otherwise reply back in a separate message thread. Once the employee has approval to make the post in the principal thread, the employee would manually copy the post (e.g., the approved posting or modified posting) back to a position in the principal thread. This is time consuming and causes cluttered inboxes and other messaging interfaces. This may also have the side effect of confusing messaging systems into grouping both the principal thread and the side thread into a same conversation. This may confuse one or more of the employee or boss.

Disclosed in some examples are methods, systems, devices, and machine-readable mediums which provide for sidebar communication threads forked from, or related to, a principal thread. The principal thread involves a first set of participants (including a participant that initiates a sidebar thread, called the sidebar initiator) and the sidebar communication thread is between a second set of participants including the sidebar initiator. The sidebar thread is a regular message thread forked from the principal thread that may include different participants from the principal thread and whose purpose is to discuss a potential posting to the principal thread. Messages in the sidebar communication thread may include a history of the principal thread, including one or more messages from the principal thread, and may include a proposed principal thread message that is the subject of the sidebar thread discussion. The sidebar thread may also include sidebar thread messages that carries the conversation of the sidebar thread participants. Once a termination condition is reached for the sidebar thread, the sidebar thread terminates and either the proposed principal thread message (as potentially modified by participants of the sidebar thread) becomes an accepted principal thread message and it is posted to the principal thread as if it was sent by the sidebar initiator or no message is posted (e.g., the proposed principal thread message is rejected). The communication threads may be e-mail, chat, IM, posts on a message board, or the like.

The principal thread may be an existing thread and the accepted principal thread message may be posted from the sidebar thread as a reply, reply all, or the like. In other examples, the accepted principal thread message may be the first message in a brand-new thread (e.g., the sidebar initiator may wish to obtain feedback before sending out the message that starts the principal thread).

The participants in the sidebar thread and the principal thread may be the same, or may be different but for the presence of a common sidebar thread initiator. The termination conditions may include approval of the proposed principal thread message, rejection of the proposed principal thread message, a specified number of sidebar thread messages, a time expiry, or the like. In some examples, the sidebar thread and its history is not retained in an inbox or other communication store of a sidebar participant. In other examples, the sidebar threads may be stored in a special inbox or communication store. In yet other examples, the sidebar thread history may be available to sidebar thread participants by selecting an option or link within a GUI displaying the main thread.

The present disclosure thus solves the technical problem of organizing sidebar message threads in a GUI of a messaging application using the technical solution of a separately tracked thread that automatically posts an approved message to the principal thread. This reduces wasted network and computing resources by reducing the messaging and time required to maintain a sidebar thread manually and then posting the result to the principal thread. This also results in improvements to a GUI interface by reducing visual clutter resulting from user-managed sidebar threads.

FIG. 1 illustrates an example logical diagram of a sidebar thread according to some examples of the present disclosure. Principal thread 100 involving participant group A was started by an original message 105 that is the root of the principal thread. A user in group A may reply, creating first reply message 110. In some examples, such as e-mail, the first reply message may include a copy of the original message 115. A user in group A may become a sidebar initiator by selecting a sidebar user interface option of a communication application, to fork the first reply message 110 to a sidebar thread. In response to the selection of the sidebar thread option, a sidebar message 160 is created. The sidebar message 160, when sent, may create a sidebar thread 150 and may be the root of the sidebar thread 150. Sidebar thread 150 may be over a same communication modality or a different communication modality as principal thread 100. In some examples, the sidebar thread 150 may be a new thread (as shown in FIG. 1), but in other examples, the sidebar thread may be added to a related (and already existing) communication thread that is different than the principal thread (see FIG. 12).

When initiating the sidebar thread, the sidebar initiator specifies a set of sidebar thread participants. This may be done by specifying a set of participants to the sidebar message 160. In the example of FIG. 1, this is sidebar thread participant group B. The set of participants in the sidebar thread may be or include participants in the principal thread (e.g., participant group A), may be different participants (with the exception of the user that created the sidebar thread), or may include both some common and some different participants. In some examples, the set of sidebar thread participants may change as users are added and subtracted with each message. For example, the first sidebar reply message 165 may add or remove participants from group B. Similarly, the participants in group A may change over time for the principal thread. Thus, the actual constituency of a participant groups of both communication threads may change over time.

The first sidebar message 160 may include a copy of the original message 152, a copy of the first reply message 154, a proposed principal thread message 156 and a sidebar message 158. This message is delivered to the sidebar thread participants in group B.

Sidebar thread participants may have a number of available actions that they can take in response to receiving the first sidebar message 160. The options may depend on settings chosen by the sidebar thread initiator when creating the sidebar thread. Example actions may include one or more of: approving the proposed principal thread message 156, rejecting the proposed principal thread message 156, replying to the first sidebar message 160 with additional sidebar messages (e.g., "looks good Bob, but I wouldn't mention our Texas operations just yet"), directly editing the proposed principal thread message 156 (which may include change tracking and notations), forwarding the sidebar message 160, or the like. In some examples, the list of actions available to a sidebar thread participant may be different for each user and may depend upon a role of the participant in an organization relative to a role of the sidebar thread initiator (e.g., an initiator's boss may have more actions available than an initiator's colleague, which both may have more actions available than an initiator's subordinate). In the Example of FIG. 1, a user in the participant group B has replied and created a first sidebar reply message 165. This message may include a copy of the original message 175, a copy of the first reply message 173, an edited proposed principal thread message 171, a copy of the sidebar message 169 and a sidebar reply message 167. Further messages between the sidebar thread participants may happen until a sidebar thread termination condition is encountered.

In some examples, the sidebar thread may be terminated upon the occurrence of one or more configured termination events. The events that terminate a sidebar thread may be configured by the sidebar thread initiator, by an administrator of the communication system, or the like. Example termination conditions may include an approval or rejection of the proposed principal thread message by a particular sidebar thread participant; approval or rejection of the proposed principal thread message by a specified number of sidebar thread participants; expiration of a specified amount of time; a specified amount of sidebar thread messages being posted to the sidebar thread; or the like. In still other examples, events from the principal thread may cause a termination event of the sidebar thread. For example, a reply after the first reply message 110 may terminate the sidebar thread.

Based upon the termination event, the sidebar thread may, or may not, post a message to the principal thread. For example, some termination events cause the sidebar thread to terminate without posting any messages from the sidebar thread (e.g., any proposed principal thread messages) to the principal thread. For example, if the proposed principal thread message was rejected by the participants in the sidebar thread. Some termination events may cause the proposed principal thread message to become an accepted principal thread message and be posted to the principal thread. In some examples, the termination events that cause no messages to be posted to the principal thread and the termination events that cause posting to the principal thread may be configured by the sidebar thread initiator, a system administrator, or the like.

In some examples, the system may allow participants of the sidebar thread to make edits to the proposed principal thread message by a sidebar thread recipient. Upon reaching a termination event of the sidebar thread, in some examples, these changes may be accepted automatically and be incorporated into the accepted principal thread message posted to the principal thread. In other examples, the edits may need to be approved by one or more sidebar thread participants (e.g., such as the initiator of the sidebar thread) in order to be incorporated into the accepted principal thread message posted to the principal thread. In some examples, whether the edits are accepted automatically or need additional approval may depend on a relative role of the editing participant in an organization as compared with the initiator. For example, if the original sidebar message 160 is sent by an employee, and the edit in the first sidebar reply message 165 is made by the employee's boss, then the edit may be accepted without approval. The relationship and roles may be determined by the communication system by communication with a directory service. Edits that require approval may be sent to participants of the sidebar thread and may include notations (e.g., redline) showing edits to the original. These notations may be stripped from the proposed reply message prior to posting to the principal thread.

In the example of FIG. 1, once the proposed principal thread message is approved, the proposed principal thread message becomes the approved principal thread message which may be posted directly to the principal thread 100 as if it came from the initiating user that created the sidebar thread. In the example of FIG. 1, the edited proposed principal thread message 171 is posted to the principal thread as a new message 120 in the principal thread. This posting may include a copy of the original message 124 and a copy of the first reply message 122.

Figure 2:
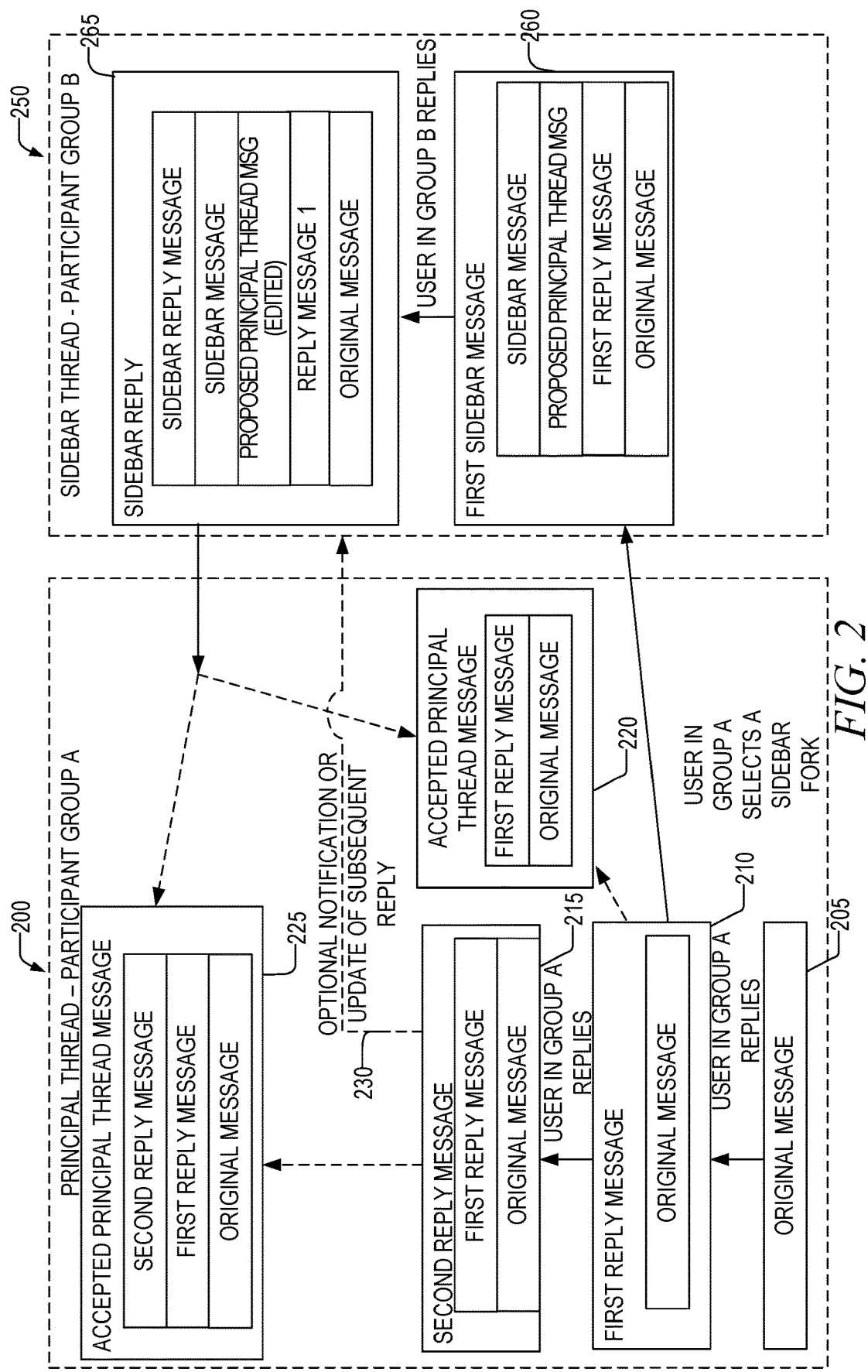
FIG. 2 illustrates an example logical diagram of a sidebar thread according to some examples of the present disclosure.

FIG. 2 illustrates an example logical diagram of a sidebar thread 250 according to some examples of the present disclosure. FIG. 2 is similar to FIG. 1, except that while the sidebar thread 250 is ongoing, a second reply message 215 is received in the principal thread 200. The principal thread 200 of FIG. 2 is started by an original message 205. A first reply message 210 includes a copy of the original message. A participant in participant group A chooses to initiate a sidebar thread from the first reply message 210 by sending a first sidebar message 260. The sidebar message 260 creates a sidebar thread 250 that forks off the principal thread at the first reply message 210. Note that a sidebar thread may be launched from the original message 205 as well, or from any other message in the principal thread 200. In some examples, a user may select the various messages of the thread to use as a fork point for the sidebar thread.

As the sidebar thread continues, producing a sidebar reply 265, but before the proposed second reply message is posted to the principal thread, a participant in the principal thread posts a second reply message 215. In some examples, the participants in the sidebar thread are all notified at 230 of the new reply. For example, the second reply message may be copied into a displayed version of a sidebar message (e.g., as if the sidebar thread forked from the second reply message). In other examples, other notifications, such as emails, attachments, or other methods of communicating the second reply message 215 to participant group B may be used. Once a termination event of the sidebar thread 250 is identified, the accepted principal thread message may be posted as a third reply message 225 as a reply to the second reply message 215 OR may be posted as a third reply message 220 to the first reply message 210. The selection of where to post the accepted principal thread message may be specified when the sidebar thread is initiated (e.g., the initiator may specify to post the response directly to where the sidebar was forked, or to a latest message in the principal thread); or may be specified when the sidebar thread 250 terminates.

Figure 3:
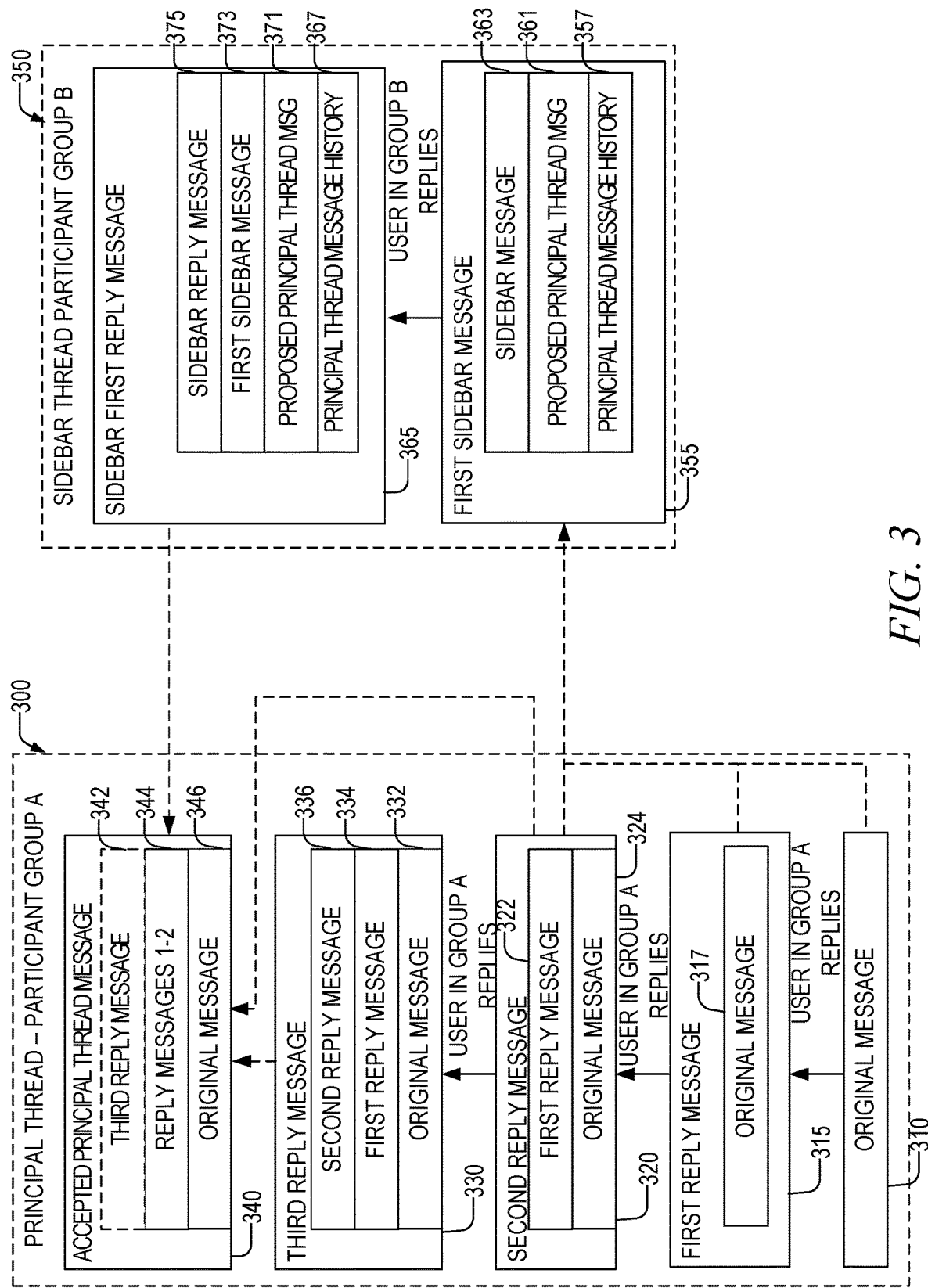
FIG. 3 illustrates an example logical diagram of a sidebar thread according to some examples of the present disclosure.

In some examples, the position in the principal thread where the sidebar thread is forked may be the currently selected message. For example, in an email client, a button similar to the reply button may allow for the creation of sidebar threads forking from the currently displayed message. In other examples, the system may allow a participant to initiate a sidebar thread creation option and then select which message in a principal thread to fork from. Likewise, the initiator may choose where to post the accepted principal thread message. FIG. 3 illustrates an example logical diagram of a sidebar thread according to some examples of the present disclosure where the point in the principal thread where the sidebar thread is forked from as well as the point in the principal thread where the accepted principal thread message is posted may be selected or otherwise configured (e.g., settings). Principal thread 300 is created when original message 310 is sent to the participant group. A participant may reply with a first reply message 315. First reply message 315 may include a copy of the original message 317. A participant in group A may reply to the first reply message 315 and create a second reply message 320. The second reply message may include a copy of the first reply message 322 and a copy of the original message 324. A participant in the principal thread may then submit an input that forks a sidebar thread 350. The initiator of the sidebar thread may select one of the messages (e.g., 310, 315, or 320—note that message 330 has not yet been posted when the sidebar thread is initiated) of the principal thread to serve as the fork point and initial thread of the sidebar thread. The message history of the thread from the original message 310 to the parent thread of the sidebar thread may be included in the first sidebar message 355. For example, if the initiator of the sidebar thread selects the original message 310 as the fork point, the principal thread message history 357, 367 included in the sidebar thread may only include a copy of the original message 310. In contrast, if the initiator selects the second reply message 320 as the fork point, the principal thread message history 357, 367 may include copies of the original message 310, first reply message 315, and second reply message 320.

As previously noted, the first sidebar message 355 may include a principal thread message history 357 with copies of the messages of the principal thread, a proposed principal thread message 361, and a sidebar message 363. A reply to the first sidebar message 355, sidebar first reply message 365, may include a sidebar reply message 375 and a copy of the first sidebar message 373. In the example of FIG. 3, the sidebar first reply message 365 does not propose any edits to the proposed principal thread message 361.

A termination event of the sidebar thread 350 may occur and be detected by the communication service and the proposed principal thread message 361, 371 may become the accepted principal thread message that is then posted to the principal thread 300. While the sidebar thread 350 was ongoing, a participant of the principal thread may have left a third reply message 330 as a reply to the second reply message. Third reply message 330 may include copies of the original message 332, first reply message 334, and second reply message 336. As a result of the termination condition, the proposed principal thread message 361, 371 may be posted as a reply 340 to any message later than, and including the fork point. The selection of which may be based upon user settings, a user selection when forking the sidebar thread, a user selection when posting the proposed principal thread message, or the like. In some examples, the proposed principal thread message 361, 371 may be posted as the accepted principal thread message as a reply to any message in the thread. As shown in FIG. 3, if the user forked the sidebar thread from message 324, the accepted principal thread message may be posted as a reply from message 324, or third reply message 330. Accepted principal thread message 340 may include a copy of the original message 346, a copy of the reply messages 1 and 2 344, and in some examples, a copy of the third reply message 342 (as well as the accepted principal thread message).

Figure 4:
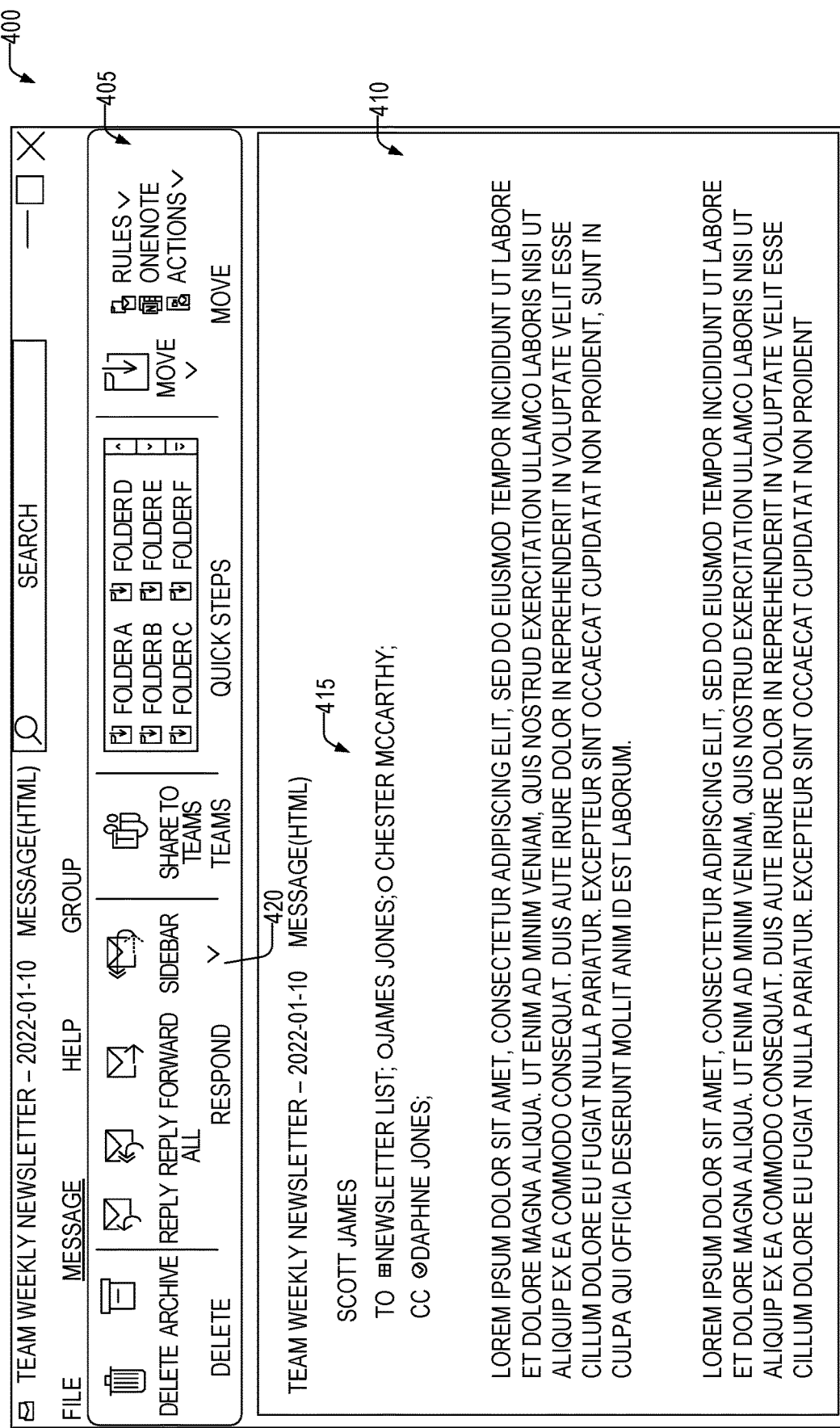
FIG. 4 illustrates a diagram of a graphical user interface (GUI) showing a message display interface with a user control for creating a sidebar thread according to some examples of the present disclosure.

FIG. 4 illustrates a diagram of a graphical user interface (GUI) 400 showing a message display interface with a user control for creating a sidebar thread according to some examples of the present disclosure. The GUI 400 shows a received message in a message window 410. Address information panel 415 shows who the message is from ("Scott James"), who the message is to ("Newsletter List", "James Jones", and "Chester McCarthy") as well as who the message was carbon copied (CC'd) to ("Daphne Jones"). A user may use a UI control in a toolbar 405 to take various actions on the message. For example, the user may delete the message, archive the message, reply to the sender, reply to all recipients and the sender, forward the message to other recipients, post the message to a unified communications platform (as shown MICROSOFT® TEAMS®), file the message in one of six different folders (e.g., "Quick Steps"), move the message, apply rules or other actions, or export the message to a note taking application (as shown MICROSOFT® ONENOTE®). The toolbar 405 may also include a sidebar fork button 420. Sidebar fork button 420 may fork a sidebar thread from the email shown in the message window 410. The button may include a drop-down menu which allows for specifying one or more parameters of the sidebar thread, such as termination conditions and allowed recipient actions (e.g., edit the proposed principal thread message, approve, reject, etc . . . ).

Figure 5:
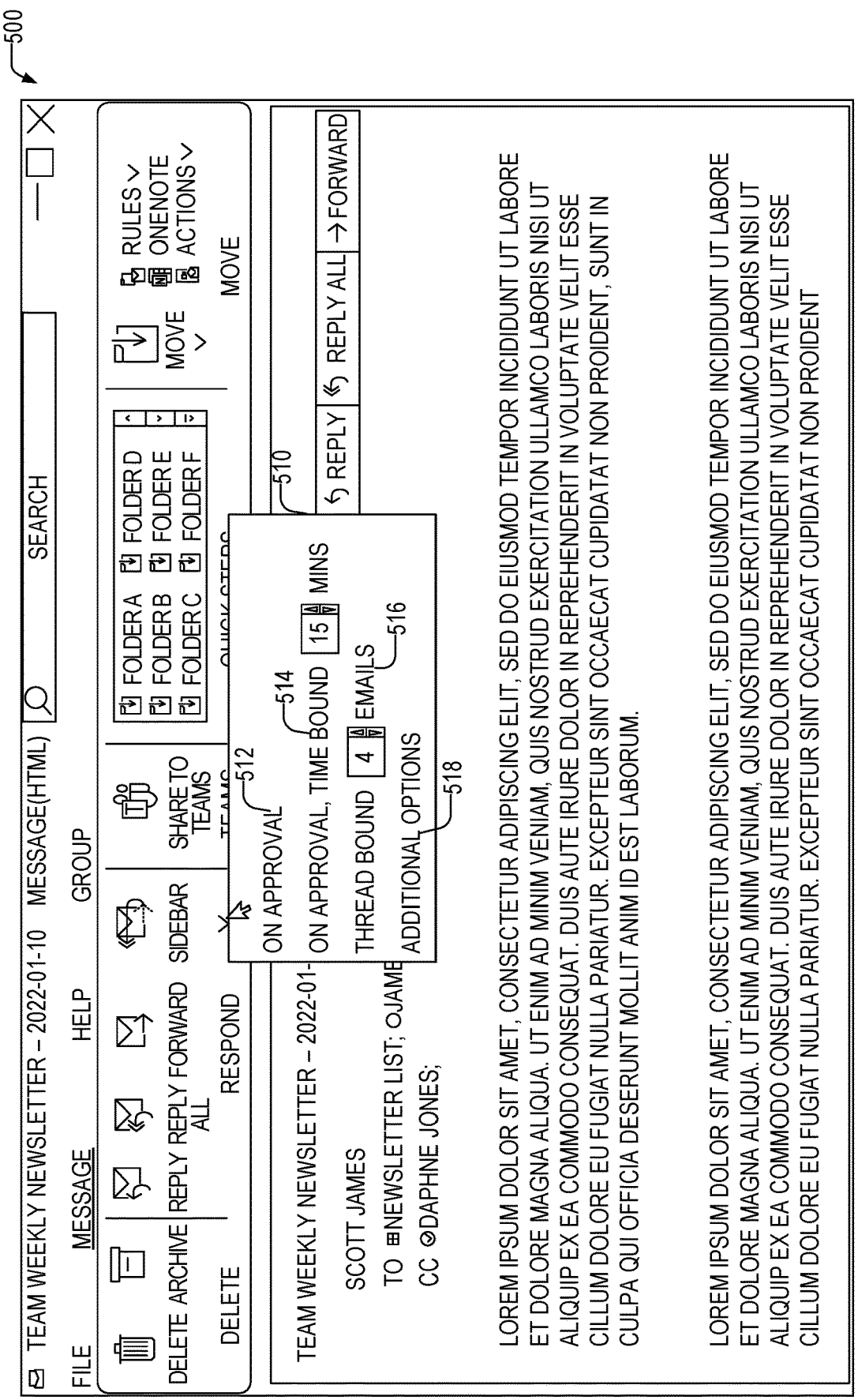
FIG. 5 illustrates a diagram of a graphical user interface (GUI) showing a message display interface with a user control for creating a sidebar thread with a deployed drop-down menu according to some examples of the present disclosure.

FIG. 5 illustrates a diagram of a graphical user interface (GUI) 500 showing a message display interface with a user control for creating a sidebar thread with a deployed dropdown menu 510 according to some examples of the present disclosure. GUI 500 is the GUI 400 with the dropdown menu 510 deployed. Dropdown menu 510 may include one or more options, such as a selection of termination events for the sidebar thread. Examples include sending the final message on approval from all recipients 512, some recipients, or certain recipients; on approval, but setting a maximum time for approval (15 minutes is shown) in box 514—thus if approval or disapproval is not received within 15 minutes, the final message is posted. Another termination condition may include a maximum number of sidebar emails (e.g., 4 emails) 516. Once the limit is reached, the current final message is sent. Additional options may be accessed by selecting the additional option item 518.

Figure 6:
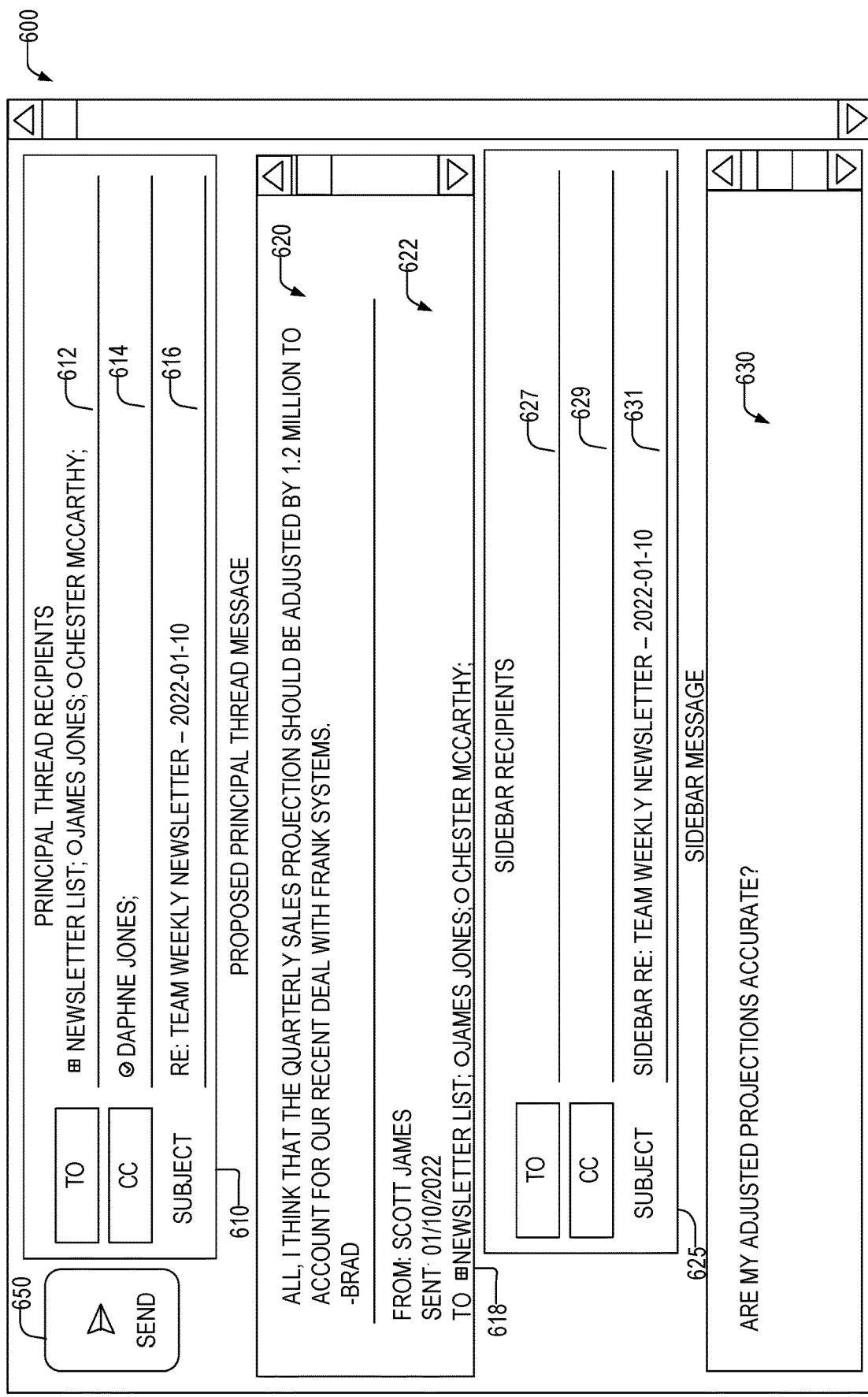
FIG. 6 illustrates a diagram of a GUI showing a sidebar thread message creation UI according to some examples of the present disclosure.

Once the sidebar thread option is selected, a sidebar thread message creation UI is displayed. FIG. 6 illustrates a diagram of a GUI 600 showing a sidebar thread message creation UI according to some examples of the present disclosure. In some examples, the termination conditions selected using the dropdown menu 510 may be configured in GUI 600. A user may enter the recipients of the accepted principal thread message (if the sidebar thread results in an accepted principal thread message) in the principal thread recipients input box 610. The principal thread recipients are the participants of the principal thread that receive the accepted principal thread message after the conclusion of the sidebar thread if the termination condition results in acceptance of the proposed principal thread message. While in some examples, these participants will be all of the participants of the primary thread, in other examples, these participants may be a subset of the participants of the primary thread. In still other examples, these participants may add additional participants. In instances where the user selected a sidebar thread creation option for a particular message of an existing principal messaging thread, the principal thread recipients input box 610 may be pre-filled in with the same participants as a reply, or reply all command from the particular message. The principal thread recipients input box 610 may have input elements for direct recipients 612 (TO), indirect recipients 614 (CC—carbon copy), and a subject box 616. In still other examples, the principal thread recipient(s) may not already be members of the principal thread. In these examples, the principal thread recipient that is not already a member of the principal thread may be added as a participant to the principal thread upon the accepted principal thread message being posted to the principal thread. In still other examples, the recipient specified may not be a principal thread participant and may not be made a principal thread participant. While shown as email addresses, the addresses of participants in sidebar threads and/or principal threads and the like may be email addresses, usernames, IP addresses, phone numbers, or the like.

A proposed principal thread message may be entered into input box 618. The proposed principal thread message input box 618 may have both the proposed principal thread message 620, and, in instances where the principal thread is an existing messaging thread, one or more messages of the existing messaging thread. For example, the particular message and parent messages may be displayed.

In addition, the GUI 600 may include sidebar recipients input box 625, including input areas for direct recipients 627, indirect recipients 629, and a subject box 631 of the sidebar thread. In addition, sidebar message text 630. Sidebar message text 630 may not be posted to the principal messaging thread upon termination of the sidebar thread. Send button 650 may send the sidebar thread message and start the sidebar thread.

While GUIs 500 and 600 were described as being displayed responsive to a received message and thus the sidebar thread was forked from an existing principal communication thread, in other examples, sidebar threads may be created as a way to seek input on the creation of a new principal thread. For example, the GUI 600 may be activated in response to selection of a "new sidebar thread" option. In these examples, once the proposed principal thread message is approved as the accepted principal thread message, that message is sent as a first message in a new thread to the recipients listed in the principal thread recipients input box 610.

In addition to the GUI 600, other sidebar thread creation GUIs may be used. For example, FIG. 7 illustrates a sidebar thread message creation user interface 700 which shows a sidebar thread message creation dialog. The message creation user interface 700 may include a sidebar thread address and subject input box 705 which specifies the sidebar thread participants. The sidebar message may include an automatically generated message 710 that informs the sidebar recipients that this is a sidebar message thread. The sidebar message thread message area 712 may be marked by control text delineated from other text with asterisks. Similarly, the proposed principal thread message may also be delineated with control text such as asterisks at area 714.

Previous principal thread history may be at area 718. These delineations may be automatically created by the system when the initiator initiates the sidebar thread, may be manually placed by the initiator, or may put in by the system at a cursor position of the user within the sidebar message based upon the sidebar start 720, sidebar end 722, principal message start 724 and principal message end 726 buttons. That is, upon pressing the sidebar start 720 button the system may paste the "*start sidebar message area *" text within the message. In the example of FIG. 7, the principal thread recipients may be a reply or reply all of the message in the principal thread to which the initiator forked the sidebar thread. In other examples, the principal thread recipients may be specified using control text or may be specified later using a UI element.

Figure 8:
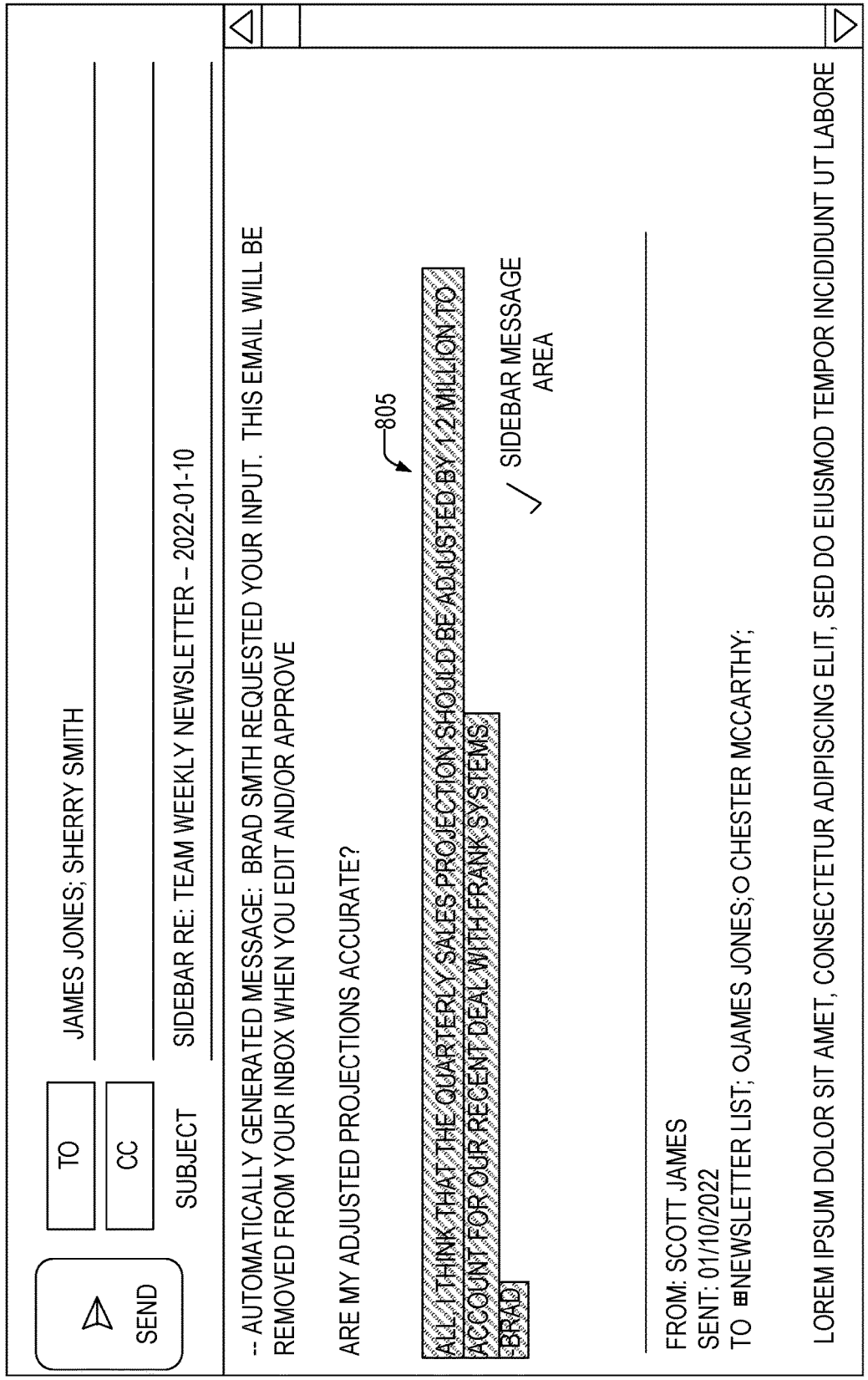
FIG. 8 illustrates another example of a sidebar thread message creation user interface with a sidebar thread message creation dialog according to some examples of the present disclosure.

FIG. 8 illustrates another example of a sidebar thread message creation user interface 700 with a sidebar thread message creation dialog according to some examples of the present disclosure. Instead of the control text of FIG. 7, in FIG. 8 the GUI 800 allows users to highlight text 805 and then press either a keyboard shortcut key or a UI button (not shown) to set the sidebar message area.

Figure 9:
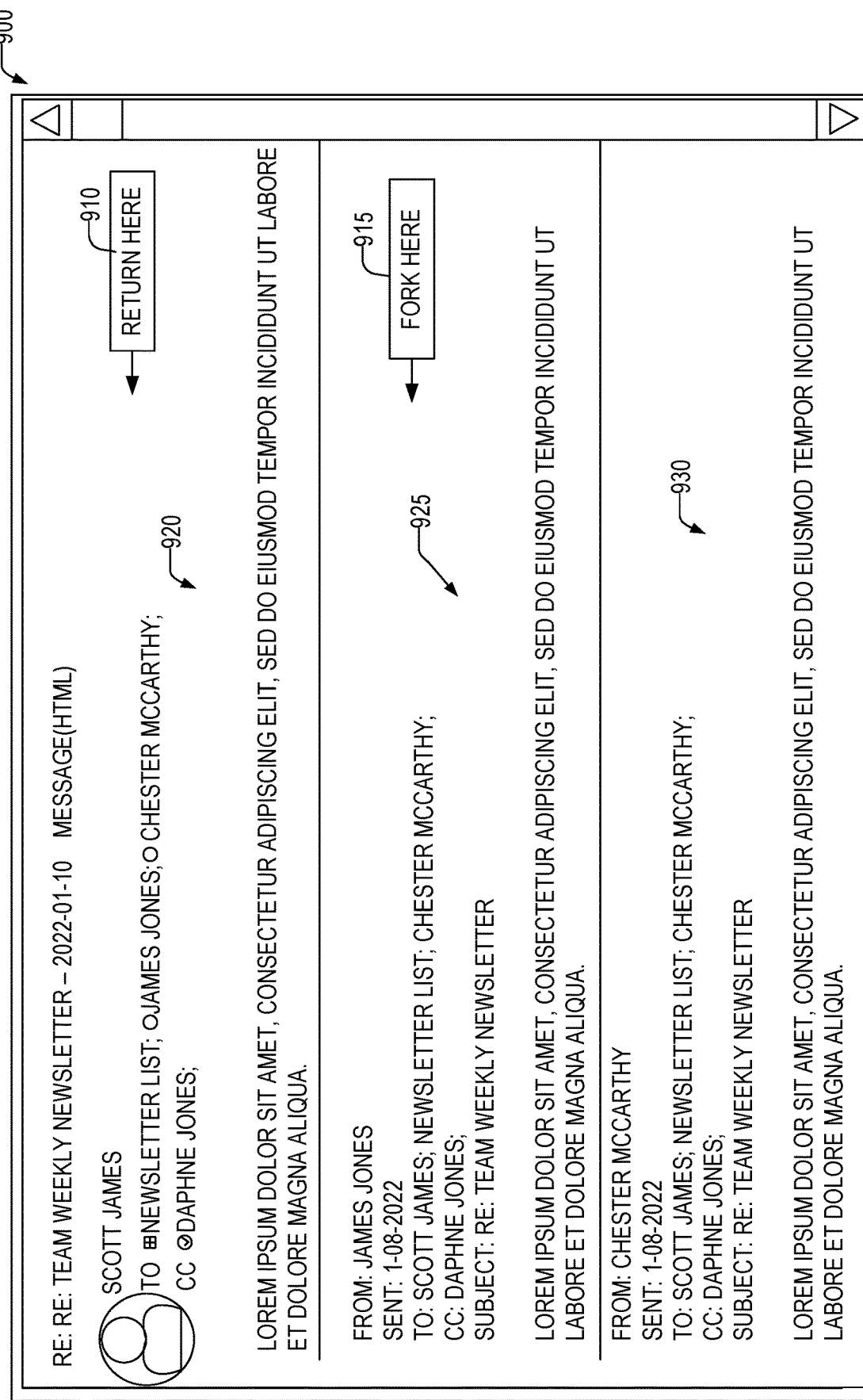
FIG. 9 illustrates a GUI of a selection interface according to some examples of the present disclosure.

FIG. 9 illustrates a GUI 900 of a selection interface that allows a sidebar thread initiator to select one or more messages of a principal thread to fork to a sidebar thread, and in some examples, also allows the sidebar thread initiator to select where the accepted principal thread message is posted. The GUI 900 shows the message thread of the principal thread. Markers 915 and/or 910 may be displayed responsive to the initiator activating one or more user interface controls to indicate that the initiator wishes to start a sidebar thread from the principal thread. Marker 915 may point to the portion of the principal thread where the sidebar thread is forked. The marker 915 may be moved by the initiator to a different message, such as messages 920, 925, or 930. For example, in FIG. 9, the marker 915 is pointing to message 925. This means that the sidebar thread may be forked from message 925 and the sidebar thread may include the message history of message prior to and including message 925. Marker 910 may mark where in the principal thread an accepted principal thread message will be posted (if any). In some examples, the user may specify where the accepted principal thread message from the sidebar thread will be posted when forking the sidebar thread. In other examples, the user may specify where the accepted principal thread message from the sidebar thread will be posted when the termination event in the sidebar thread occurs.

While FIG. 9 illustrated a sidebar thread initiator selecting the return point when the sidebar thread is created, in other examples the selection of the fork and/or return point may be made using a GUI such as GUI 900 at different times. For example, just before posting the approved principal thread message from the sidebar thread. While the initiator may be the person to select the fork and/or return points, in other examples, other participants of the sidebar thread may be the ones to select the fork and/or return point. For example, as part of an approval process.

Figure 10:
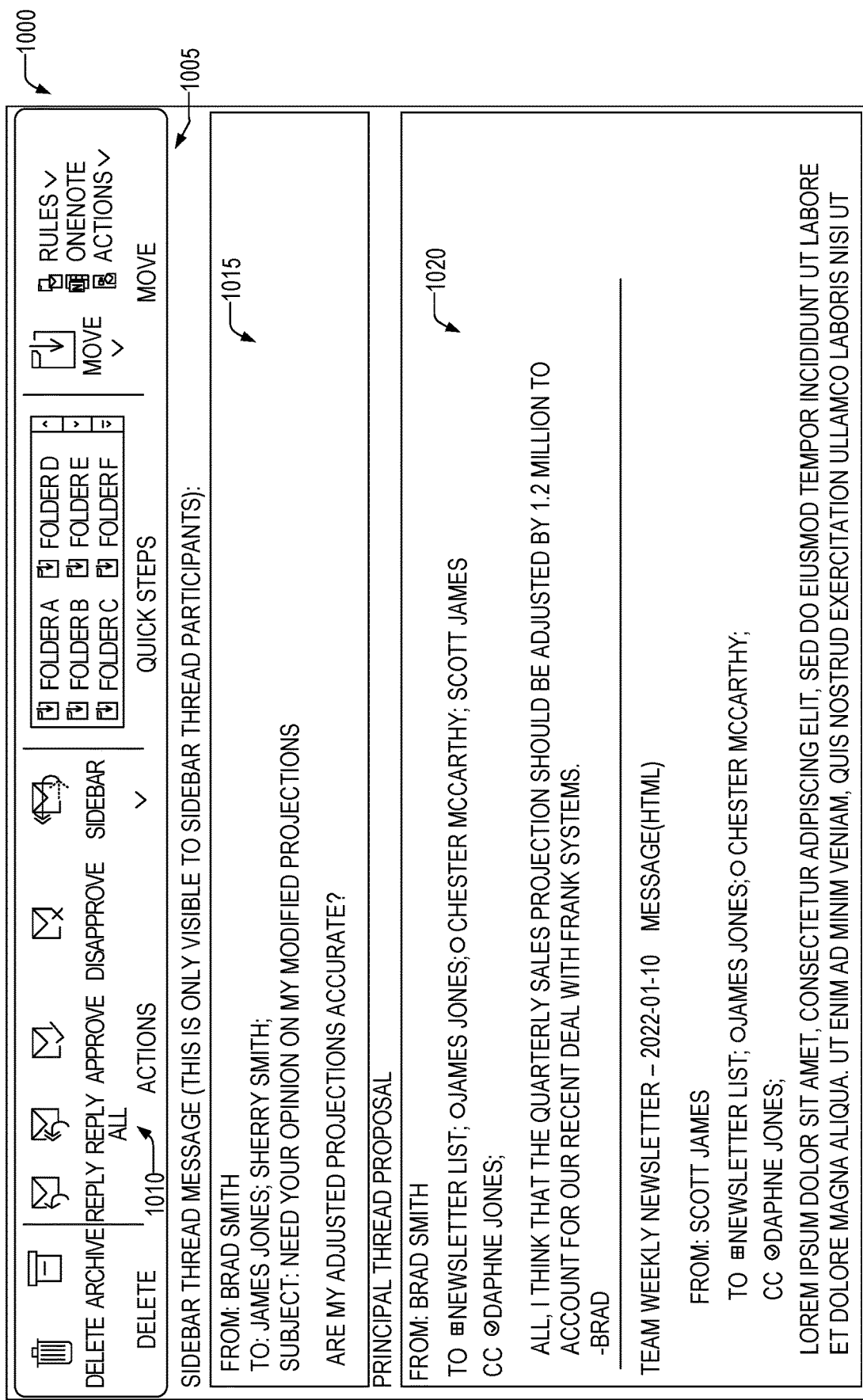
FIG. 10 illustrates a GUI of a message screen shown to a sidebar thread participant when receiving a sidebar message of a sidebar thread according to some examples of the present disclosure.

FIG. 10 illustrates a GUI 1000 of a message screen shown to a sidebar thread participant when receiving a sidebar message of a sidebar thread according to some examples of the present disclosure. The GUI 1000 may include a toolbar 1005, a sidebar thread message display area 1015 and a principal thread proposal message display area 1020. The sidebar thread message display area 1015 shows the sidebar thread messages and the principal thread proposal message display area 1020 may show the proposed principal thread message, and in some examples, any edits made to the proposal (e.g., using track changes). The principal thread proposal message display area 1020 may also show one or more previous messages of the principal thread, such as a message history of messages prior to the point at which the sidebar thread forked from the principal thread.

Actions controls 1010 may provide the sidebar message recipient with one or more options for taking action on the received sidebar message. The available actions may vary based upon the identity of the sidebar message recipient. For example, the actions shown may not be valid for all users. The valid actions may depend on settings of the sidebar thread initator who may specify valid actions for all users, valid actions for particular users (e.g., one user may be able to edit the proposed principal thread message while another user may not based upon the settings specified by the initiator), or the like. Shown in FIG. 10, the actions include a reply action and a reply all action. The reply action replies to the sender of this sidebar thread message. In the case of a first message in the sidebar thread, the reply button would reply to the sidebar initiator. A reply-all action may reply to all participants in the sidebar thread. The reply message may show a GUI like GUI 600 which allows the sidebar participant to edit the proposed principal thread message, contribute a sidebar message (and the sidebar message box may include the sidebar message history), add or remove sidebar recipients and/or the principal thread participants (for when the accepted principal thread message is posted to the principal thread—if that happens), and the like. In some examples, and as already noted, the particular sidebar participant may not have authorization to edit the proposed principal thread message or the principal thread participants. In some examples, the particular sidebar participant may not have authorization to reply or reply-all. In some examples, the actions may include approving or disapproving the currently displayed principal thread proposal.

The approval or disapproval actions for participants may be available for each new message in the sidebar thread. That is, a first sidebar message may be approved, disapproved, replied, replied-all, edited, and the like. An approval signifies that the proposed principal thread message is acceptable for this participant. Disapproval signifies that the proposed principal thread message is not acceptable for this participant. Both approval and disapproval may allow the participant to propose edits to the principal thread proposal. In some examples, an edit to the proposed principal thread message may invalidate all previous approvals or disapprovals.

As previously described, one possible sidebar thread termination event may include approval or disapproval of the proposed principal thread message. In some examples, a certain prespecified number or percentage of sidebar thread participants must approve for the proposed principal thread message to become an accepted principal thread message that is then posted to the principal thread. If the required number or percentage is not reached, then the sidebar thread may continue—e.g., edits may be made by one or more participants to the proposed principal thread message or conversations with sidebar thread messages may occur until either the required number or percentage is reached that approve, a required number or percentage is reached that disapprove, a time limit, or a sidebar thread message limit is reached, or some other termination event is reached. As noted, once a particular version of the proposed principal thread message achieves enough approvals, it may be posted to the principal thread as an accepted principal thread message. Additionally, in some examples, and as already noted, only certain sidebar thread participants may have approval or disapproval power.

Figure 11:
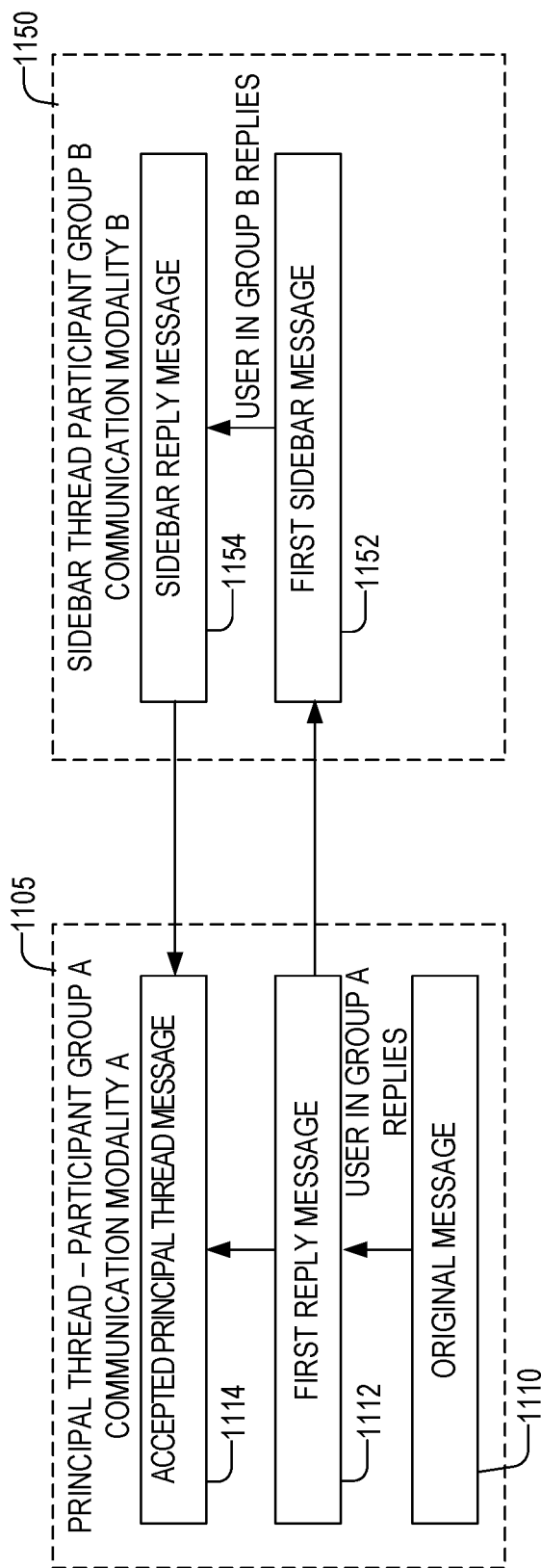
FIG. 11 illustrates a logical diagram of a sidebar thread that takes place on a different communication modality than the principal thread according to some examples of the present disclosure.

FIG. 11 illustrates a logical diagram of a sidebar thread that takes place on a different communication modality than the principal thread according to some examples of the present disclosure. An original message 1110 serves as a root message of a principal conversation thread 1105. A first reply message 1112 is created and a communication participant in the principal thread decides to fork the first reply message 1112 to a sidebar thread 1150. The sidebar thread commences with message 1152 and a reply message 1154. The reply message 1154 terminates the sidebar thread 1150 and the proposed principal thread message becomes an accepted principal thread message and is posted to the principal thread 1105 with message 1114. In some examples, the principal thread is hosted on a first communication modality and the sidebar thread is hosted on a second communication modality. For example, the principal thread may be an email thread and the sidebar thread may be a message board.

In some examples, the system may suggest a sidebar thread of a different communication modality. For example, based upon a number of common participants between the sidebar thread (as entered by the initiator when forking the thread) and the second communication modality, a similarity of topics between the sidebar thread and one or more threads of the second communication modality (e.g., as determined by a Natural Language Processing algorithm, Latent Dirichlet Analysis, or the like). The suggestion may be presented to the user either before or after the user activates a control to send the sidebar message to create the sidebar thread. The system my post the entire sidebar thread to the second communication modality and then post a message from that second communication modality back to the principal thread on the first communication modality (as shown in FIG. 11). In other examples the system may post the sidebar thread to the first communication modality and a link to the sidebar thread to the second communication modality.

Figure 12:
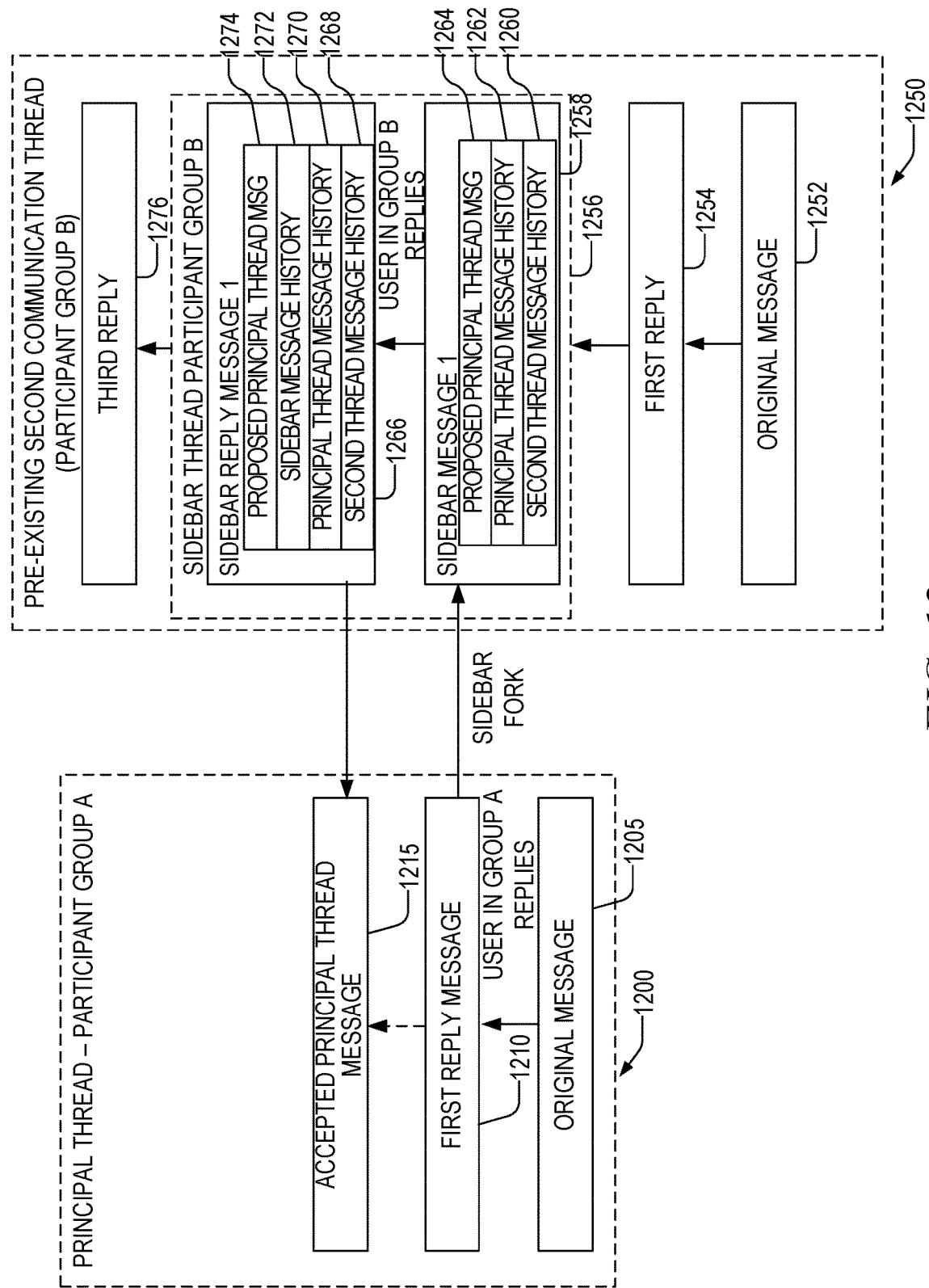
FIG. 12 illustrates a logical diagram of a sidebar thread that is forked from a principal thread into an existing second communication thread according to some examples of the present disclosure.

FIG. 12 illustrates a logical diagram of a sidebar thread that is forked from a principal thread into an existing second communication thread according to some examples of the present disclosure. A principal thread 1200 is started by an original message 1205 among the participants in group A. A member of group A replies to create a first reply message 1210. A member of group A then initiates a sidebar thread with a sidebar fork. The initiator may specify one or more sidebar thread participants. The system may scan pre-existing communication threads of the initiator to find similar threads and may prompt the initiator to ask if the initiator wishes to post the sidebar thread within one of the existing communication threads.

Similar threads may be determined based upon a number of common participants between the second communication thread and those entered for the sidebar thread. That is, a similar thread may be one where a percentage or number of common participants exceeds a threshold. In still other examples, the subject of the thread may be compared with the subject of the sidebar communication and/or the principal thread. Similarity may be judged based upon a similarity score using a NLP algorithm. Similarity scores above a threshold may be used to indicate similar threads. In yet other examples, a similarity of the contents of the principal thread, the sidebar thread, and the second communication thread may be assessed using a NLP algorithm to produce the similarity score. Similarity scores above a threshold may be used to indicate similar threads. In still other examples, two or more of common participant measurements, similarity scores of the subject, and similarity scores of the contents of the threads may be used to suggest similar threads. User selection of the similar threads may be used to refine the NLP models, or to adjust the thresholds.

The second communication thread 1250 may be started by an original message 1252 and may have a first reply 1254. The sidebar thread 1256 may then be merged into the second communication thread 1250. For example, by posting the first sidebar message 1258 as a reply, or reply-all to a message of the second communication thread 1250, such as the first reply 1254. The first sidebar message 1258 may include a second thread message history 1260, a principal thread message history 1262, the proposed principal thread message 1264 and a sidebar message. A participant of the sidebar thread may reply. The first sidebar reply message 1266 may include a copy of the second thread message history 1268, the principal thread message history 1270, the sidebar message thread history 1272, and the proposed principal thread message 1274 (either the original or as edited by the reply). Once the termination event is detected, the sidebar thread terminates and either the proposed principal thread message (either the original or as-edited based upon the configuration and approvals received) is posted to the principal thread as accepted principal thread message 1215 or nothing is posted. In the example of FIG. 12, the message is posted as a reply to the first reply message from the initiator in participant group A. As previously stated, the message may be posted to the principal thread as coming from a first user (the initiator) automatically based upon an approval of a second user to the proposed principal thread message. Once the sidebar thread terminates, the second communication thread may continue with third reply 1276. In some examples, the third reply 1276 may be a reply from the first sidebar reply message 1266 and may preserve the history of the sidebar thread. In other examples, it may be a reply from the first reply 1254 and the history of the sidebar thread 1256 may be removed from the second communication thread.

In some examples, the records of the messages of the sidebar communication thread may be removed from the participants of the sidebar thread. For example, messages and other records from the sidebar thread may be deleted from the inboxes, outboxes, or other folders of the participants. In other examples, the messages and records of the sidebar communication thread may be saved or preserved in a special folder (e.g., an archive folder). In yet other examples, whether the sidebar thread messages and records are removed, saved, or moved to a different place may be specified by settings of the initiator, an administrator, or the like.

Figure 13:
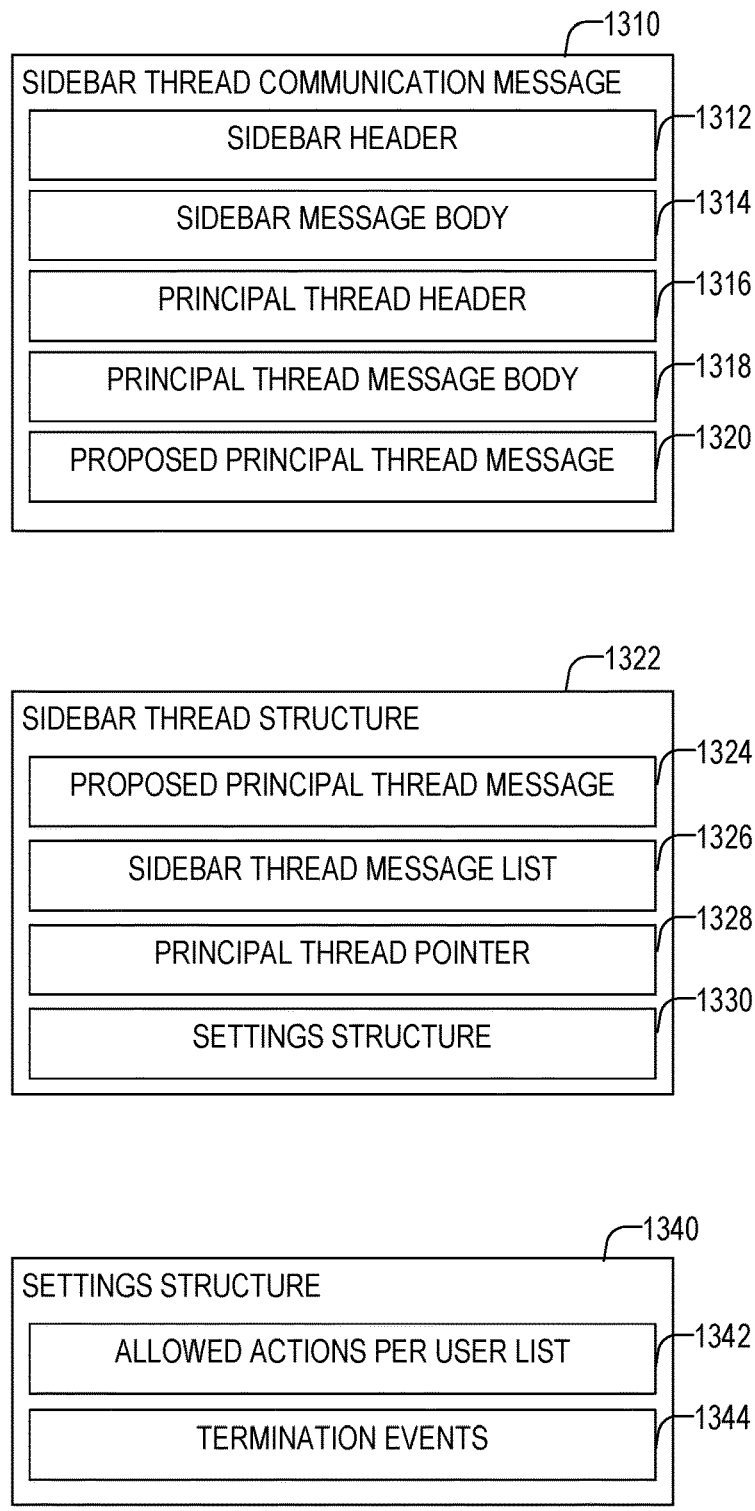
FIG. 13 illustrates an example of data structures corresponding to a sidebar thread according to some examples of the present disclosure.

FIG. 13 illustrates an example of data structures corresponding to a sidebar thread according to some examples of the present disclosure. Sidebar thread communication message 1310 may store information related to a single sidebar thread communication message. Sidebar header 1312 may identify the message as part of a sidebar conversation and may indicate addresses of recipients of the sidebar thread message. The sidebar header 1312 may also include the subject of the sidebar thread communication message. The sidebar message body 1314 may store the sidebar message body contents, including the new sidebar thread communication message and in some examples (e.g., email) past sidebar thread communications.

The principal thread header 1316 may include the recipients of an accepted principal thread message (if the termination event results in posting the proposed principal thread message as the accepted principal thread message) which may be all the participants of the principal thread or may be a subset of the participants of the principal thread. The recipients of the principal thread may include additional, newly added participants not already participants of the principal thread. The principal thread message body 1318 may include principal thread history that is shown to the sidebar participants. The history may be all the messages of the principal thread, a summary of the messages of the principal thread (either entered by the initiator manually, or by a summarization algorithm), a link to thread history, or the like. The proposed principal thread message 1320 is the current proposed principal thread message that will be posted as the accepted principal thread message if the termination event of the sidebar thread indicates acceptance.

Sidebar thread communication message 1310 may be created by one or more communication clients or the communication server, stored on a communication server (e.g., in a mailbox) and then transmitted to one or more communication clients for display to sidebar thread participants. In other examples, the sidebar thread communication message 1310 may be converted to/from other structures as appropriate for the Application Programming Interface between the communication clients and communication server.

Sidebar thread data structure 1322 may be stored on the server and/or clients and may be a record of the sidebar thread. Proposed principal thread message 1324 may store the current (as edited) proposed principal thread message 1324. In some examples, the proposed principal thread message 1324 may store an edit history of the proposed principal thread message 1324 that may provide a view of each edit and by which participant of the sidebar thread made the edit.

Sidebar thread message list 1326 may be a header of a linked list of sidebar thread communication messages 1310. Principal thread pointer 1328 may point to a message in the principal thread or to a principal thread structure that points to the messages in the principal thread. Setting structure 1330 includes or points to a setting structure, such as settings structure 1340. In some examples (and not shown) each sidebar thread communication message may include a pointer to a next message in a list. Thus, the sidebar thread message list 1326 may be a linked list with the sidebar thread message list 1326 being a list head.

Settings structure 1340 may include an allowed actions field 1342. The allowed actions field 1342 may specify allowed actions for participants of the sidebar thread. The allowed actions may be for all participants or may be broken down by user such that some users have different actions they can take. Termination events 1344 specifies the events that terminate the sidebar thread and which of those events and under what conditions the proposed principal thread message to be accepted as the accepted principal thread message and posted to the principal thread and which of the termination events and under what conditions the proposed principal thread message is not accepted as the accepted principal thread message and thus not posted to the principal thread.

Figure 14:
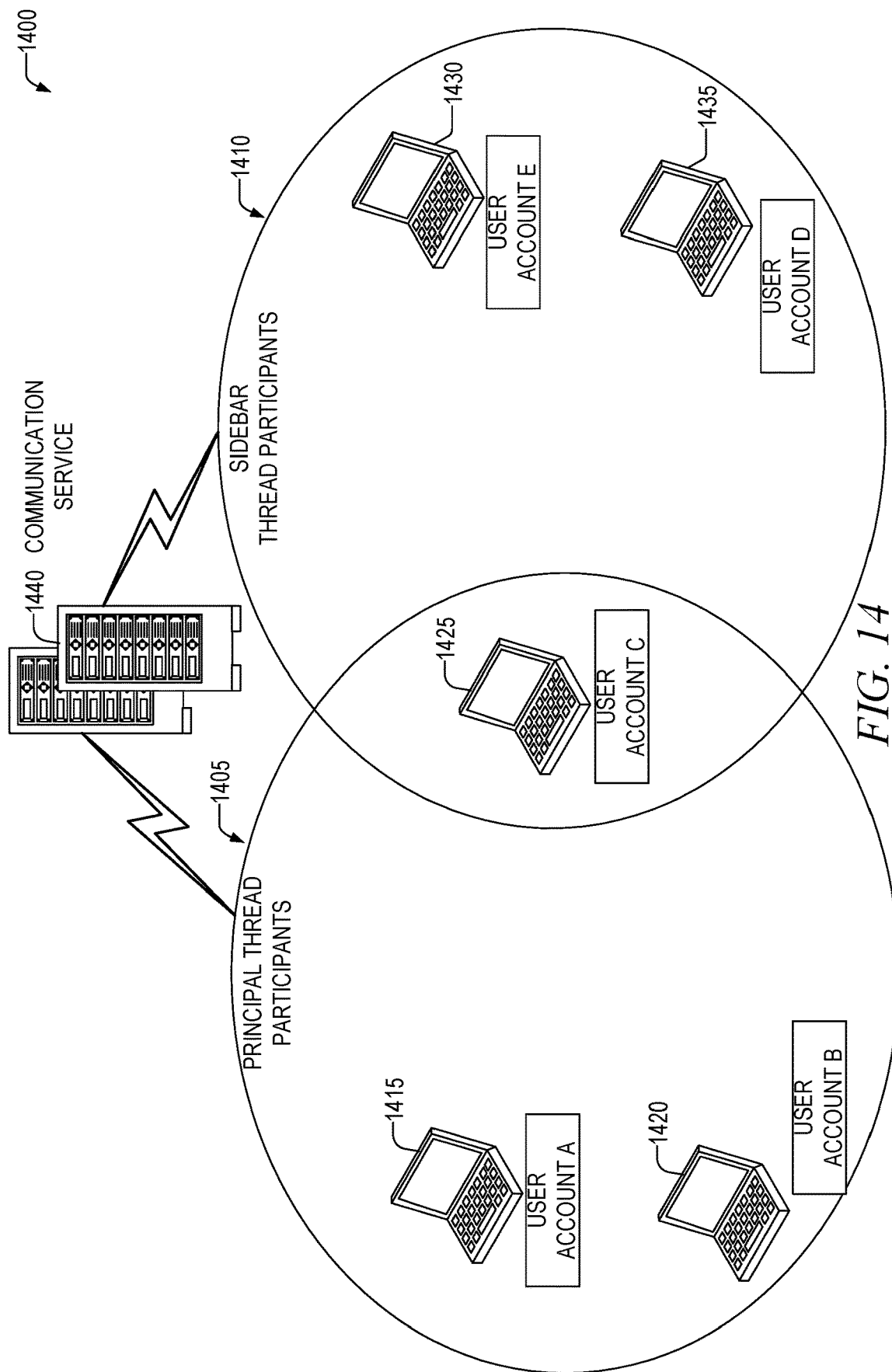
FIG. 14 illustrates a logical diagram of a group of principal thread participants and a group of sidebar communication thread participants according to some examples of the present disclosure.

In some examples, the sidebar thread may be serviced entirely by a same communication service. For example, all participants of a sidebar thread may obtain the communication service from a same communication service. In these examples, computing devices of the communication service may provide the sidebar thread, monitor for termination events, and post the result to the principal thread. FIG. 14 illustrates a logical diagram 1400 of a group of principal thread participants 1405 and a group of sidebar communication thread participants 1410 according to some examples of the present disclosure. Participants are represented by user accounts of the communication service. For example, the principal thread participants include user account A 1415, user account B 1420, and user account C 1425. User accounts may be logged into and viewing communications using communication applications executing on one or more devices corresponding to, or owned by, the users that own the user accounts. User account C 1425 is an initiator user and account. The sidebar communication thread participants 1410 include the initiator user account, user account C 1425, user account D 1435, and user account E 1430. In the example of FIG. 14, all the thread participants are serviced by a same communication service 1440. In these examples, the communication service 1440 may provide both the sidebar thread and the principal thread.

The communication service 1440 may handle detection of the termination event of the sidebar thread and posting the accepted principal thread message to the principal thread. For example, when a termination event is detected, such as an approval of the user accounts D and/or E of the proposed principal thread message, the communication service 1440 may make the proposed principal thread message the accepted principal thread message and post that to the principal thread on behalf of (but not directly sent by) the user account C 1425. This post is made, as if directly made, by the user account C 1425, but is in actuality may be responsive to an action of another user account of the sidebar communication thread participants 1410.

Figure 15:
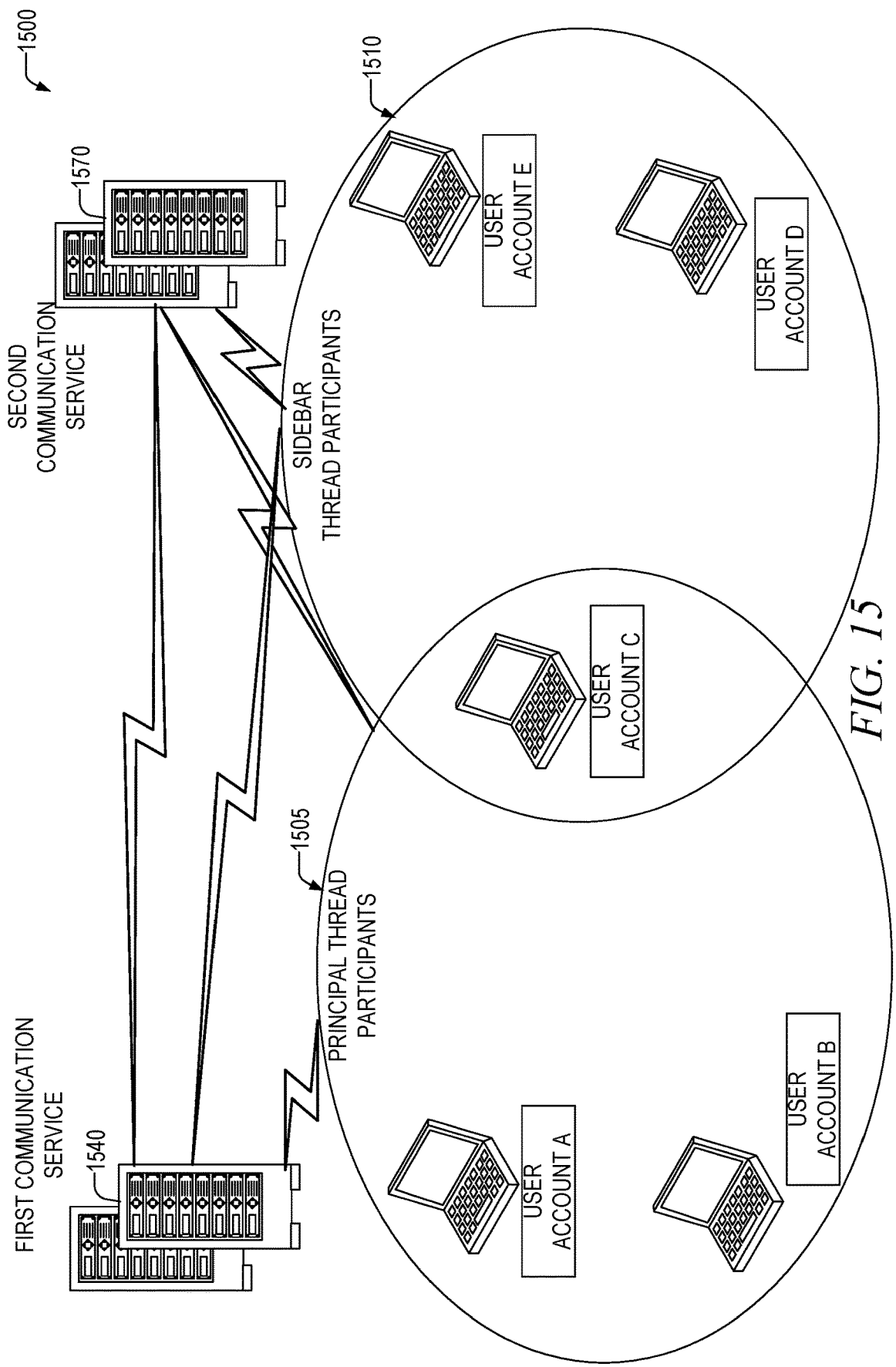
FIG. 15 illustrates a logical diagram of a group of principal thread participants and a group of sidebar communication thread participants according to some examples of the present disclosure.

FIG. 15 illustrates a logical diagram 1500 of a group of principal thread participants 1505 and a group of sidebar communication thread participants 1510 according to some examples of the present disclosure. One or more of the user accounts of either or both of the principal thread participants 1505 or the sidebar communication thread participants 1510 may be hosted by first communication service 1540 and/or second communication service 1570. In examples in which multiple communication services service accounts are involved in the sidebar thread, both communication services and/or applications may be configured to provide sidebar threads and to recognize a message addressed to a communication recipient hosted by the communication service is a sidebar thread. This allows the communication service and/or the applications to notify the participants that this is a sidebar thread and provide a GUI such as that shown in FIG. 10.

In addition, having both communication services support sidebar threads allows the communication service and/or the applications to provide the appropriate actions to the participants, detect various sidebar thread termination events, and to send the accepted principal thread message to the principal thread when a termination event causes the proposed principal thread message to become the accepted principal thread message. For some termination events, only one communication service may track these events. For example, a time-based termination event may be monitored by the communication service hosting the initiator user's account. In some examples, upon detection of a termination event of the sidebar thread that results in the proposed principal thread message becoming an accepted principal thread message, and if the communication service that hosts the initiator account is not the one that detected the termination event, the communication service that detects the termination event may contact the communication service that hosts the initiator account to inform that communication service that the proposed principal thread message should be sent to the principal thread on behalf of the initiator as the accepted principal thread message.

Communication services may communicate with each other using one or more Application Programming Interfaces (APIs) and/or one or more standard messages — such as those specified by one or more Request For Comments (RFC) that may describe or standardize message exchanges and formats for implementing communications such as email. These RFCs may be updated to provide for sidebar threads.

Figure 16:
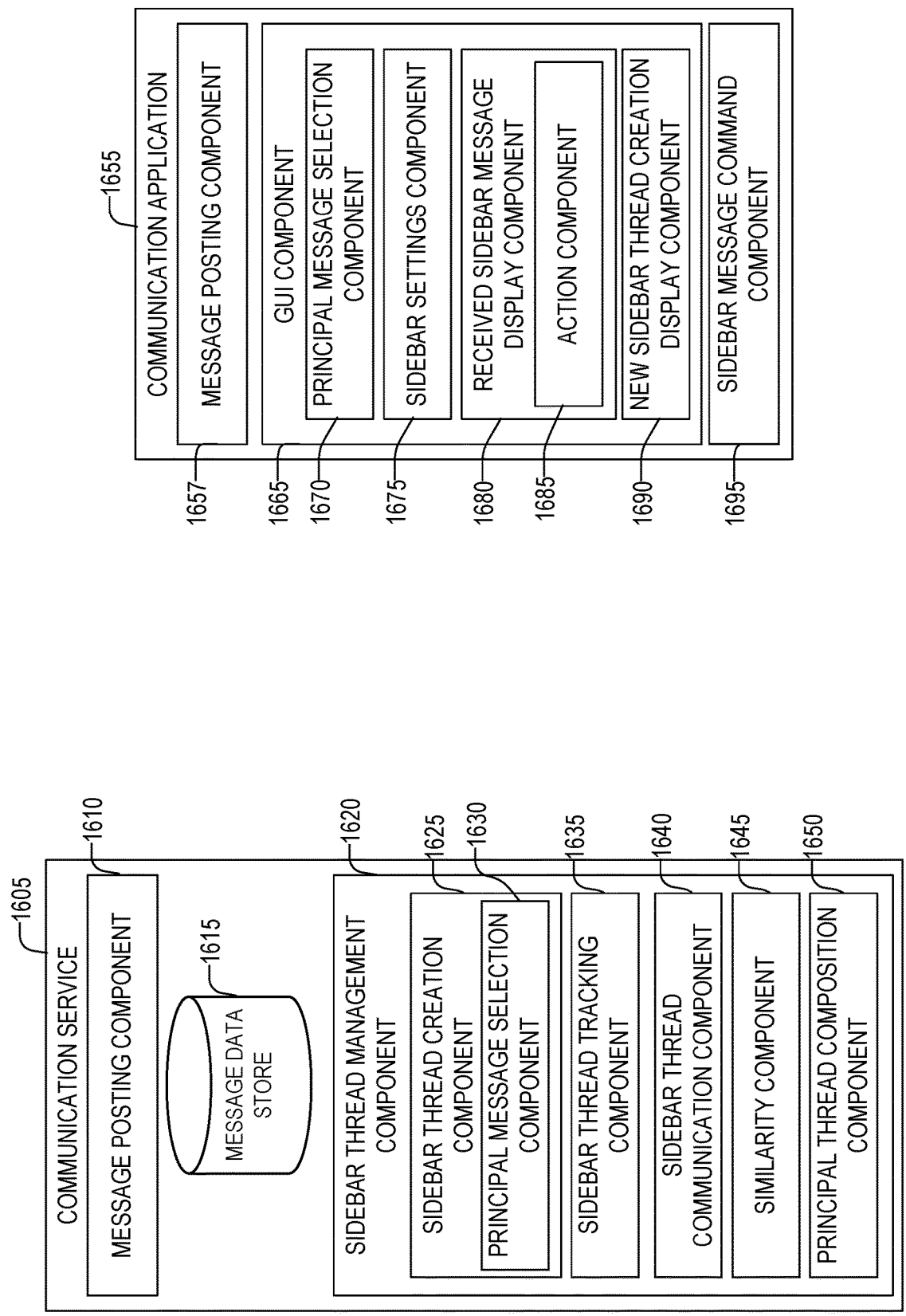
FIG. 16 illustrates logical diagrams of a communication service and a communication application according to some examples of the present disclosure.

FIG. 16 illustrates logical diagrams of a communication service 1605 and a communication application 1655 according to some examples of the present disclosure. One or more computing devices may be configured to implement the communication service 1605 and communication application 1655, for example, by software. While certain components are shown in FIG. 16, it will be appreciated by one of ordinary skill in the art that additional components not shown may be part of the communication service 1605 and the communication application 1655. In addition, the logical diagrams in FIG. 16 are exemplary and fewer or more components may be used and functionality described for one or more components may be performed by one or more other components. Communication service 1605 includes components (which may not be shown for clarity in FIG. 16) which may, along with the communication application 1655, provide communications between one or more user accounts of one or more users of both this communication service and one or more other communication services over one or more communication modalities. Communication modalities may include email, text, chat, instant messaging, message boards, Voice over Internet Protocol (VoIP), video calling, online meetings, and the like. Communication application 1655 may interface with the communication service 1605 to provide the communication service to client computing user devices of the user accounts.

Communication service 1605 may include a message posting component 1610 which may post one or more messages, including messages for a principal thread, a sidebar thread, or other threads. Messages may be posted in a variety of ways, including adding the message to a mailbox of a user or a message store for a group in the message data store 1615, sending a message to a communication application 1655, sending a message to another communication service, or the like. Posting, as used herein, means a method of delivering a message using a particular communication modality. For example, for email, posting means sending an email; for instant messaging, posting means sending an instant message; for message boards, posting means publishing a message to a message board; or the like.

Communication service 1605 may include a sidebar thread management component 1620 that may manage sidebar threads, such as creation of sidebar threads, termination of sidebar threads, communication with other communication services with respect to sidebar threads, posting the accepted principal thread message in the principal thread, and the like. For example, when the communication service 1605 receives a command to create a sidebar communication thread forked from a principal communication thread, the sidebar thread creation component 1625 of the sidebar thread management component 1620 may receive (as part of the command, or as the command) the sidebar thread communication message 1310 of FIG. 13 and in response, may create a sidebar thread data structure 1322. The sidebar thread creation component 1625 may initialize a settings structure 1330 with settings as received in the creation command or as subsequently entered by a user or sent with a different command. The creation command may be a specific creation command (which may include a sidebar thread message), or a sidebar thread message (which may be identified using one or more header fields or flags) sent to sidebar thread participants. In addition, the proposed principal thread message may be extracted and added to the proposed principal thread message 1324 of the sidebar thread data structure 1322. As sidebar messages are posted by sidebar thread participants, the sidebar thread management component 1620 may add them to the sidebar thread message list 1326. In addition, the sidebar thread management component 1620 may fill out and track the other elements of the data structures of FIG. 13.

In some examples, the principal message selection component 1630 manages selection of both the fork point for the sidebar thread within a principal message and a return point if a proposed principal thread message is accepted and posted to the principal thread as the accepted principal thread message. In some examples, messages of the communication service include both a thread identifier (which may be termed a conversation identifier) and a message identifier. Upon receipt of the command to create a sidebar thread, the command may include a thread identifier of the principal thread and a message identifier of which message to fork from. In some examples, this corresponds to the principal message to which the user selected a sidebar thread fork option. In other examples, this may be a different message as selected by the principal message selection component 1670 of the communication application 1655.

The principal message selection component 1630 of the communication service 1605 may determine the message that the sidebar thread is forked from using one or both of the thread identifier and the message identifier by searching the message data store 1615 for the message matching the thread identifier and/or message identifier. The principal message selection component 1630 may then determine a communication of the principal thread by extracting the message body from a message body field in the message data structure. This communication may then become part of the sidebar thread. The principal message selection component 1630 may then determine principal thread recipients to the sidebar communication using one or more recipient fields in the message data structure.

In some examples, the same procedures may apply to the merge point where the accepted principal thread message may be posted to the principal thread. That is, the principal message selection component 1630 may determine the message of the principal thread that the sidebar thread is merged back to using one or both of the thread identifier and the message identifier by searching the message data store 1615 for the message matching the thread identifier and/or message identifier. The principal message selection component 1630 may then determine a communication of the principal thread by extracting the message body from a message body field in the message data structure. This communication may then become part of the message posted back to the principal thread along with the accepted principal thread message.

Sidebar thread tracking component 1635 may track sidebar thread messages and maintain the sidebar thread data structure 1322 by updating the sidebar thread message list 1326, track any settings changes made by the initiator or other users in the settings structure 1330, track any changes made to the proposed principal thread message 1324, track changes made to principal thread or sidebar thread participants, and/or monitor for termination events specified by the settings in the setting structure 1330.

Sidebar thread communication component 1640 communicates with one or more other communication services in order to provide the sidebar thread as previously described with reference to FIG. 15. The sidebar thread communication component 1640 may use one or more APIs, standard formats (such as RFCs), protocols, or the like. Communications may include messages of the sidebar thread, the principal thread, settings information, termination event information, or the like.

Similarity component 1645 may find and recommend to the initiator one or more other similar threads to the sidebar thread or the principal thread, whether in a same communication modality or a different modality. In some examples, the similarity component may contact other communication services to find these threads involving the sidebar participants, the principal thread participants, or the like. In some examples, similarity may be determined based upon the number of common participants between the principal thread or the sidebar thread and the similar thread. Threads with a number of common participants above a threshold may be suggested for an initiator.

In other examples, a similarity score may be calculated that may quantify a calculated similarity in the threads based upon a number of factors. In some examples, the factors may be weighted. In some examples, the similarity score may be calculated as a weighted sum of the factors. Factors include a number of common participants between the principal thread or the sidebar thread and the similar thread; a calculated textual similarity between subjects of the threads (e.g., in the subject line of the email, the topic description of a chat room or message board, or the like); a calculated textual similarity in the contents of the threads; a number of same attachments in the threads (e.g., as determined by file fingerprints, names of the files, sizes, and/or the like); and the like. The similarity score of text may be measured by one or more NLP algorithms as described herein.

As noted, the termination events may be monitored by the sidebar thread tracking component 1635. Upon detecting a termination event, the sidebar thread tracking component 1635 may evaluate whether the event caused the proposed principal thread message to become the accepted principal thread message. If not, then the sidebar thread tracking component 1635 may clean up the sidebar thread. Cleanup may include deleting or archiving one or more of the data structures of FIG. 13, hiding the sidebar thread from communication applications of participants, removing the sidebar thread from communication applications of participants, and the like. Should the event cause the principal thread message to become the accepted principal thread message, then the sidebar thread tracking component 1635 notifies the principal thread composition component 1650.

Principal thread composition component 1650 may create the post to the principal thread upon the sidebar thread experiencing a termination event causing the proposed principal thread message to become the accepted principal thread message. Example termination events include an acceptance of the proposed principal thread message. Such a posting may be done responsive to the approval or modification to the proposed principal thread message and in some examples, may be done automatically in response to the approval or modification to the proposed principal thread message. The principal thread composition component 1650 may create a principal thread communication from an address of the initiator of the sidebar thread addressed to the address of one or more principal thread recipients (such as the recipients identified by the principal thread selection component or those identified in the command creating the sidebar thread). The principal thread composition component 1650 includes the approved principal thread message (e.g., either the initial proposed principal thread message or a modification thereto) as the message body. The principal thread composition component 1650 may then post this message to the principal thread recipients from the address of the initiator in the principal communication thread. In some examples, the principal thread composition component 1650 may not include any of the sidebar thread messages in the post to the principal thread.

Communication application 1655 may include a message posting component 1657 that posts messages (including sidebar thread creation commands or messages) to one or more communication threads by sending a command or other message to the communication service 1605 where it is handled by the message posting component 1610 and/or the sidebar thread management component 1620 in the case the message or command is a sidebar thread. GUI component 1665 provides for one or more GUIs, such as those in FIGS. 4-10. New sidebar thread creation display component 1690 may provide one or more sidebar creation thread GUIs in response to the selection of a sidebar thread creation UI element. For example, in response to activation of the sidebar fork button 420, the new sidebar thread creation display component 1690 may display one or more GUIs such as FIGS. 6, 7, and 8. Sidebar settings component 1675 may display one or more GUIs allowing users (e.g., participants of the sidebar thread such as the initiator) to specify one or more settings of the sidebar thread. For example, the dropdown menu 510 of FIG. 5.

Principal message selection component 1670 may display one or more user interfaces allowing a sidebar participant such as an initiator to select a fork point and/or a return point where the accepted principal thread message from the sidebar thread is posted to the principal thread. For example, using a GUI such as shown in FIG. 9.

Received sidebar message display component 1680 displays received messages for a sidebar thread, whether that sidebar thread was initiated with the user of this communication application 1655 instance, or another user. For example, by displaying a GUI as shown in FIG. 10. Action component 1685 may determine one or more available actions for this user and display UI controls allow the user to take the actions on a GUI. These actions may be described as metadata in the sidebar message that is received. For example, metadata of the sidebar message may describe actions available to each user. Action component 1685 may both determine the actions available to this user but also: display user interface elements to allow the user to take those actions; respond to a user activating the user interface elements; and sending an activation indication of the action to the sidebar message command component 1695. Sidebar message command component 1695 may create and send a command to create a sidebar thread to the communication service 1605, send one or more action notifications (e.g., accept, approve, reply, edit the proposed principal thread message), or other sidebar thread messages or commands to the communication service 1605.

Figure 17:
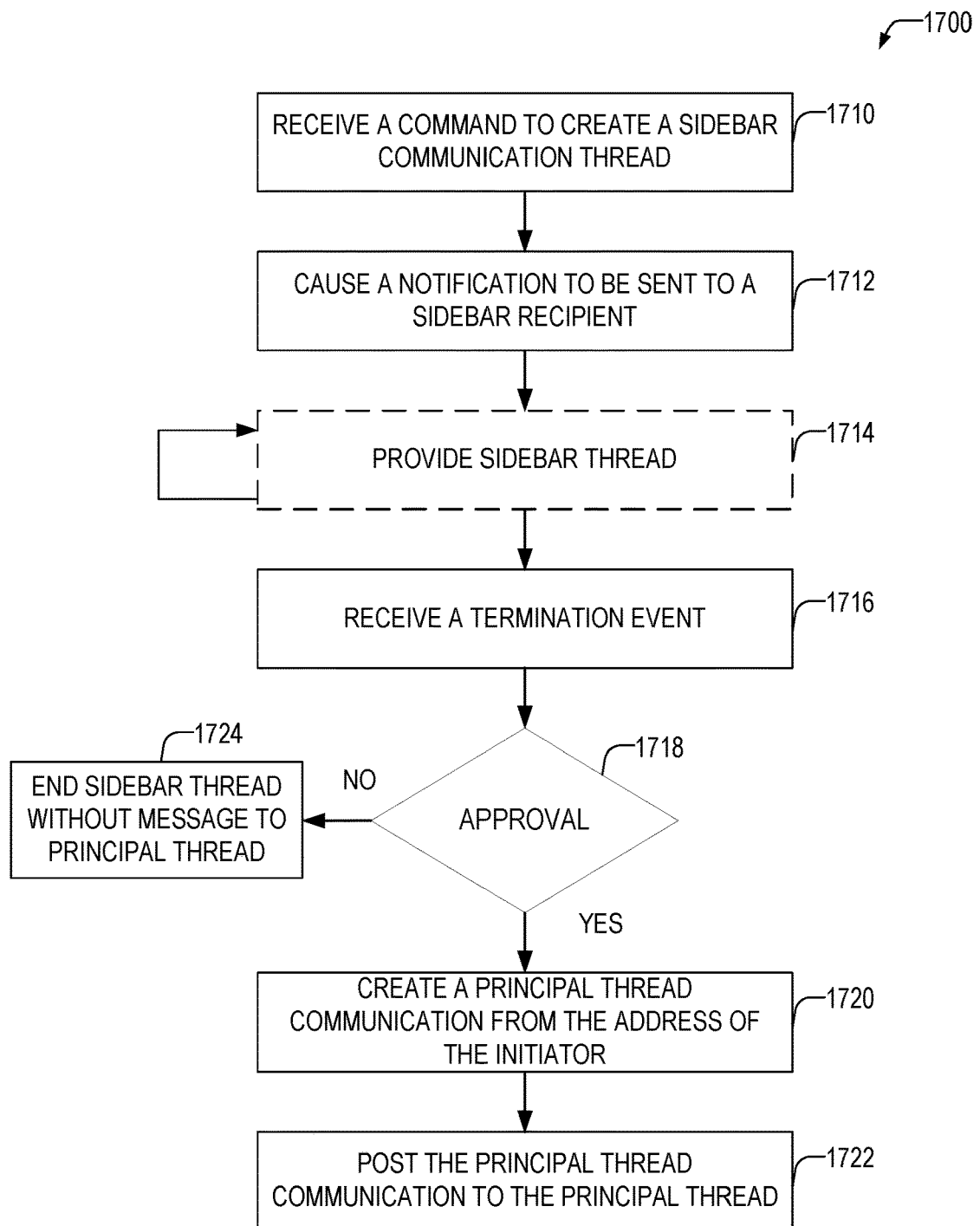
FIG. 17 illustrates a flowchart of a method of providing a sidebar thread according to some examples of the present disclosure.

FIG. 17 illustrates a flowchart of a method 1700 of providing a sidebar thread according to some examples of the present disclosure. At operation 1710 the communication service may receive a command from an initiator user account via a computing device of the initiator to create a sidebar communication thread forked from a first communication thread (the principal communication thread). The principal communication thread may be between a first plurality of principal communication thread participants including the initiator (e.g., the sender of the command to create the sidebar thread). The first plurality of principal communication thread participants may include a final recipient user account. The final recipient user account is designated to receive the accepted principal thread message if the sidebar thread terminates in a manner that causes the proposed principal thread message to become the accepted principal thread message. The final recipient may be all of the participants of the principal thread, some members of the principal thread, a single member of the principal thread, or may not be a member of the principal thread until added by the post from the sidebar thread.

In some examples, the sidebar communication thread may be a thread between a second plurality of thread participants including the sender and a sidebar recipient. In some examples, the command to create the sidebar communication thread includes a proposed principal thread message, an address of the final recipient, and an address of a sidebar thread recipient. The command may be in the form of a sidebar thread message, a specific command, or the like and may be received from the initiator's computing device over a network. In some examples, the command may include one or more sidebar thread messages that may be delivered along with the proposed principal thread message to the sidebar participants. The proposed principal thread message and the sidebar thread messages (e.g., the initial sidebar thread message as well as subsequent sidebar thread messages) may be displayed in one or more GUIs in a manner to visually distinguish them from each other.

In response, the communication system creates the sidebar thread (e.g., as described with respect to FIG. 16) by initializing one or more data structures (such as those shown in FIG. 13). At operation 1712, the communication system may cause a notification to be sent to a sidebar thread recipient. For example, by sending a sidebar thread message, or other command to the sidebar thread recipient over a communication network. At operation 1714, the system may provide the sidebar thread until a termination event occurs. This may include sending and receiving one or more sidebar thread messages from one or more sidebar thread participants. This may also include modifications to the proposed principal thread message. This may include tracking those modifications. This may also include tracking and responding to various actions of the sidebar thread participants.

At operation 1716 a termination event may occur, which may be received, or otherwise recognized. At operation 1718, the system may determine whether the termination event corresponds to an event that is an approval or modification of the proposed principal thread message that causes the proposed principal thread message to be posted as the accepted principal thread message to the principal thread. If the termination event does not correspond to an event that is an approval or modification of the proposed principal thread message that causes the proposed principal thread message to be posted as the accepted principal thread message to the principal thread — e.g., the proposed principal thread message is rejected, then at operation 1724, the sidebar thread may be ended without a message to the principal thread. Additional clean up operations may be undertaken to remove the sidebar thread message history from inboxes or other communication stores and either delete them or move them to a different location that does not clutter up the inbox or communication store of the sidebar thread participants.

If, on the other hand, the termination event does correspond to an event that is an approval or modification of the proposed principal thread message that causes the proposed principal thread message to be posted as the accepted principal thread message to the principal thread, then operations 1720 and 1722 may be performed. At operation 1720, the system may create a principal thread communication from an address of the initiator addressed to the address of the final recipient (e.g., one or more participants of the principal communication thread). The principal thread communication includes the accepted principal thread message. The accepted principal thread message may be the proposed principal thread message or any modification of that message as specified by the settings of the sidebar thread. The modifications may be made by sidebar thread participants, the initiator, or the like and may be approved by one or more other participants, depending on the sidebar settings and the approved actions and roles of sidebar thread participants. At operation 1722 the principal thread communication may be posted to the principal thread.

In some examples, the approval at operation 1718 may be received from a sidebar thread participant that is not the initiator. In some examples, the operations 1720 and 1722 may be performed automatically in response to the approval at operation 1718. In some examples, the message posted to the principal thread may be sent or posted to the principal thread on behalf of the initiator of the sidebar thread. In some examples, the principal thread communication may be created without including any of the sidebar thread messages and only includes the accepted principal thread message (which is the proposed principal thread message and accepted edits according to the settings of the sidebar thread).

Figure 18:
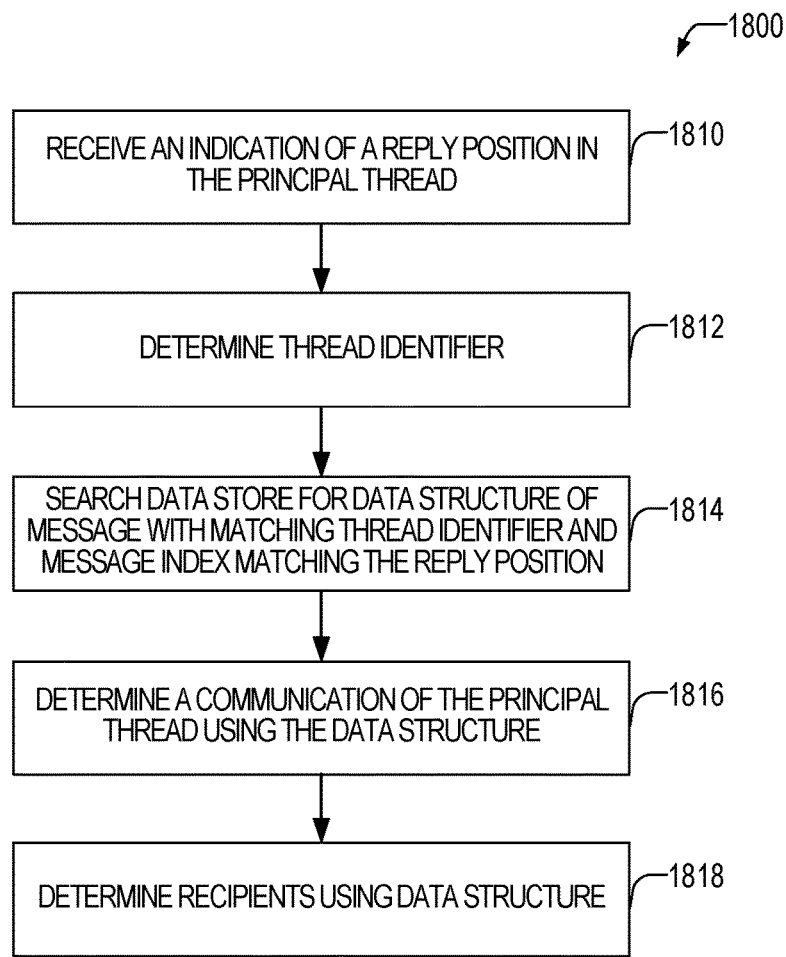
FIG. 18 illustrates a flowchart of a method in which a reply position in the principal thread for the accepted principal thread message is specified according to some examples of the present disclosure.

FIG. 18 illustrates a flowchart of a method 1800 in which a reply position in the principal thread for the accepted principal thread message is specified according to some examples of the present disclosure. At operation 1810, the system may receive an indication of a reply position in the principal thread. The indication may be included in the command to create the sidebar thread at operation 1710 of FIG. 1. In other examples, the indication may be a setting of the user, the system, or an administrator. The setting may be that the reply position is the position at which the sidebar thread was forked, a current principal thread message (which may be a later message from the position at which the sidebar thread was forked), or the like. In other examples, the indication may be received after the command to create the sidebar thread, for example, a sidebar thread participant (the initiator or other participant) may specify the position in the principal thread while the sidebar thread is ongoing. The reply position may be a message identifier relative to the thread identifier.

At operation 1812, the system may determine a thread identifier of the principal thread—e.g., from the sidebar thread creation command or the like. For example, based upon the principal thread pointer 1328 of the sidebar thread data structure 1322. At operation 1814, the data store of the communication service may be searched for a message data structure with a thread identifier matching the determined thread identifier from operation 1812 and with a message index matching the reply position. At operation 1816, the system may determine a communication of the principal thread using the data structure. For example, a message body of the message and a message history. At operation 1818, the system may utilize the message data structure from operation 1814 to determine recipient principal thread participants. The principal thread communication determined at operation 1816 and the recipients determined at operation 1818 may be used to create the principal thread communication at operation 1720 and as recipients that receive the communication posted at operation 1722.

Figure 19:
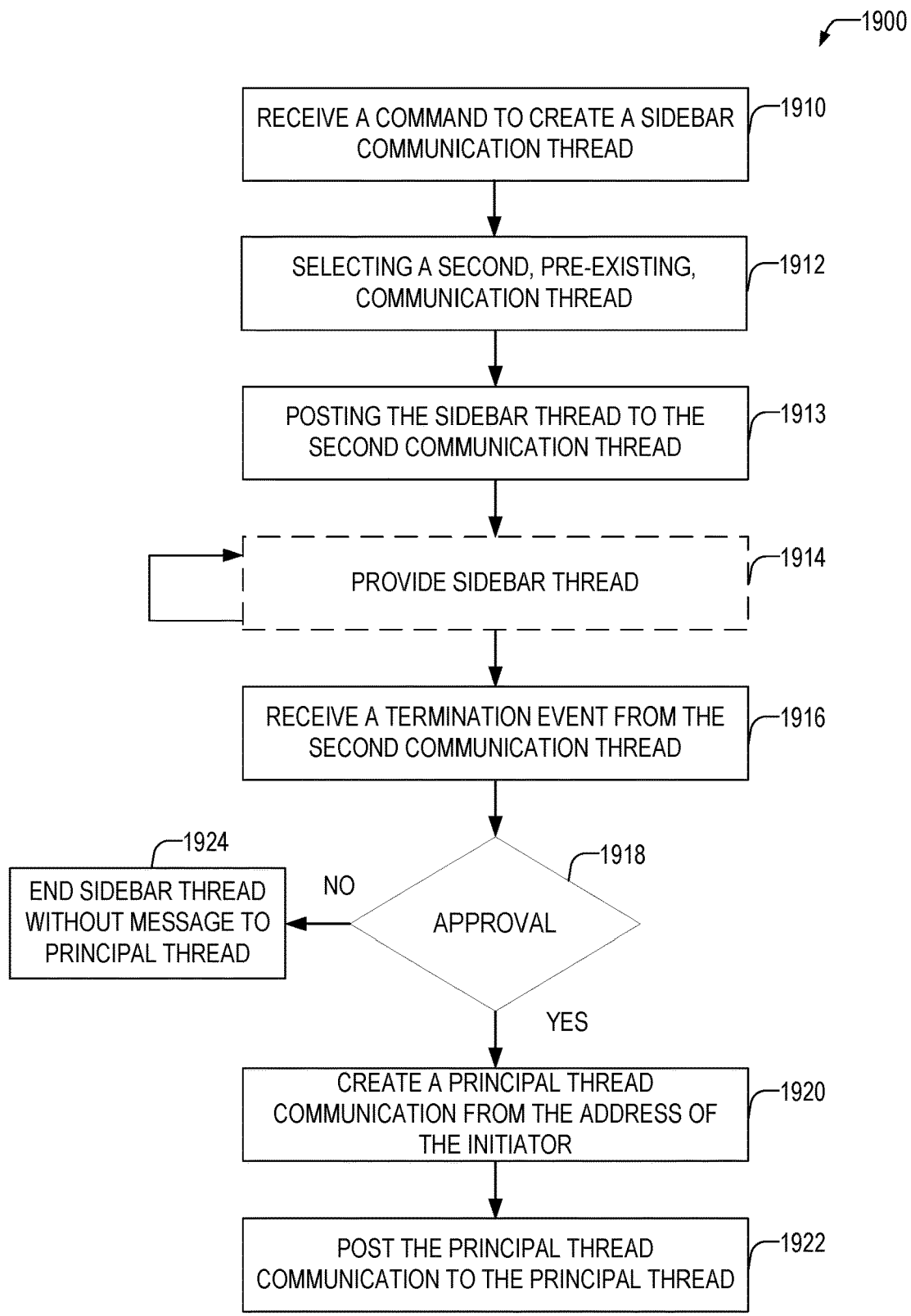
FIG. 19 illustrates a flowchart of a method of providing a sidebar thread as part of a related pre-existing thread according to some examples of the present disclosure.

FIG. 19 illustrates a flowchart of a method 1900 of providing a sidebar thread as part of a related pre-existing thread according to some examples of the present disclosure. At operation 1910 the communication service may receive a command from an initiator user account to create a sidebar communication thread forked from a principal communication thread. The principal communication thread may be between a first plurality of principal communication thread participants including the initiator and also including a final recipient user account. In some examples, the sidebar communication thread may be a thread between a second plurality of sidebar communication thread participants including the sender and at least one sidebar recipient. In some examples, the command to create the intermediate communication thread includes a proposed principal thread message, an address of the final recipient, and an address of the intermediate recipient. The command may be a sidebar thread message, a specific command, or the like and may be received from the initiator user device over a network. In some examples, the command may include one or more sidebar thread messages that may be delivered along with the proposed principal thread message to the sidebar participants. The proposed principal thread message and the sidebar thread messages (e.g., the initial sidebar thread message as well as subsequent sidebar thread messages) may be displayed in one or more GUIs in a manner to visually distinguish them from each other.

At operation 1912, the system may find a second, pre-existing communication thread. In some examples the second thread may be based upon a similarity to the principal thread; the sidebar thread; or both the principal thread and the sidebar thread; to the second thread. In some examples, the second thread may be selected based upon at least one common participant of the sidebar communication thread and the second communication thread. In some examples, the second thread must be a thread to which the initiator user is a participant. In other examples, the initiator may not be a thread to which the initiator user is a participant.

In response, the communication system creates the sidebar thread (e.g., as described with respect to FIG. 16) by initializing one or more data structures. At operation 1913, the communication system may create the sidebar thread by posting a message of the sidebar thread to the second communication thread. For example, by sending a sidebar thread message, or other command to the sidebar thread recipients over a communication network that is posted to the second communication thread. In some examples, the sidebar thread is part of, or a child of, the second communication thread. In some examples, once the sidebar thread terminates the messages of the sidebar thread are removed from the second communication thread. In other examples, the messages stay, but the second communication thread resumes the conversations and/or discussions of that thread. In some examples, the sidebar communication thread may be a fork of the second communication thread. Thus, the original conversation of the second communication thread may continue and the sidebar thread may be a fork of the second communication thread. The system may provide a UI dialogue to the user to ask if the user wishes to utilize the second thread for the sidebar thread. If the user accepts, then the method continues. If the user does not accept than the sidebar thread continues as per FIG. 17.

At operation 1914, if the user accepts, the system may provide the sidebar thread as part of the second communication thread until a termination event occurs. This may include sending and receiving one or more sidebar thread messages from one or more sidebar thread participants. This may also include modifications to the proposed principal thread message.

At operation 1916 a termination event may occur, which may be received, or otherwise recognized from the second communication thread. At operation 1918, the system may determine whether the termination event corresponds to an event that is an approval or modification of the proposed principal thread message that causes the proposed principal thread message to be posted as the accepted principal thread message to the principal thread. If the termination event does not correspond to an event that is an approval or modification of the proposed principal thread message that causes the proposed principal thread message to be posted as the accepted principal thread message to the principal thread—e.g., the proposed principal thread message is rejected, then at operation 1924, the sidebar thread may be ended without a message to the principal thread.

If, on the other hand, the termination event does correspond to an event that is an approval or modification of the proposed principal thread message that causes the proposed principal thread message to be posted as the accepted principal thread message to the principal thread, then operations 1920 and 1922 may be performed. At operation 1920, the system may create a principal thread communication from an address of the initiator addressed to the address of the final recipient (e.g., one or more participants of the principal communication thread). The final recipient may be a reply, reply-all, subset of the principal communication thread participants, or the like. The principal thread communication including the accepted principal thread message. The accepted principal thread message may be the proposed principal thread message or any modification of that message as specified by the settings of the sidebar thread. The modifications may be made by sidebar thread participants, the initiator, or the like and may be approved by one or more other participants, depending on the sidebar settings and the approved actions and roles of sidebar thread participants. At operation 1922 the message created at operation 1920 may be posted to the principal thread.

In some examples, the approval at operation 1918 may be received by a sidebar thread participant that is not the initiator. In some examples, the operations 1920 and 1922 may be performed automatically in response to the approval at operation 1918. In some examples, the message posted to the principal thread may be sent or posted to the principal thread on behalf of the initiator of the sidebar thread. In some examples, the principal thread communication may be created without including any of the sidebar thread messages and only includes the accepted principal thread message (which is the proposed principal thread message and accepted edits according to the settings of the sidebar thread).

In the example of FIG. 19, if there are differences in the participants of the sidebar thread and the second communication thread, there are several options. In some examples, the initiator specifies the participants in the sidebar thread, and those participants selected to be in the sidebar thread, but who are not also in the second communication thread may not be included in the sidebar thread. That is, the selection, by the user, of the second thread to host the sidebar thread may be an acknowledgement to remove users indicated for the sidebar thread that are not in the second communication thread. This may also be an acknowledgement that users not indicated for the sidebar thread that are present in the second communication thread are to be included as sidebar thread participants.

In other examples, the users in the sidebar thread that are not part of the second communication thread may be invited to participate in the second communication thread. In some examples, this invite terminates when the termination event of the sidebar occurs. Once that occurs, the additional participants may not participate in the second communication thread. In some examples, the additional participants in the sidebar thread that were not previously part of the second communication thread may see previous history of the second thread. In other examples, the additional participants in the sidebar thread that were not previously part of the second communication thread may not see previous history of the second thread prior to the sidebar thread.

In some examples, participants of the second communication thread that are not invited by the initiator to be part of the sidebar thread may not see the sidebar thread communications as part of the second communication thread. In other examples, these users can see the sidebar thread communications but cannot reply or participate. In still other examples, they may be invited as participants of the sidebar thread.

Participants of the communication threads, including the sidebar communication threads may change over time. That is a first message of the communication thread may have a set of participants and a second message may have different participants. Thus, the set of participants of a thread may depend on the message of a thread being considered.

In some examples, threads, messages, or the like may be compared to determine whether they are similar. In some examples, these similarity metrics may use textual or topical similarity. These similarity metrics may use various algorithms such as NLP algorithms for similarity between two texts. One algorithm may be a cosine similarity of text vectors where each dimension is a different term or word for the words in both texts being compared (e.g., one hot encoding). The vectors for the first text and the second text are then scored based upon a cosine angle between the vectors. Other algorithms may include a Euclidean distance algorithm, Word2Vec algorithm, neural networks, Latent Dirichlet algorithms, and the like.

Figure 20:
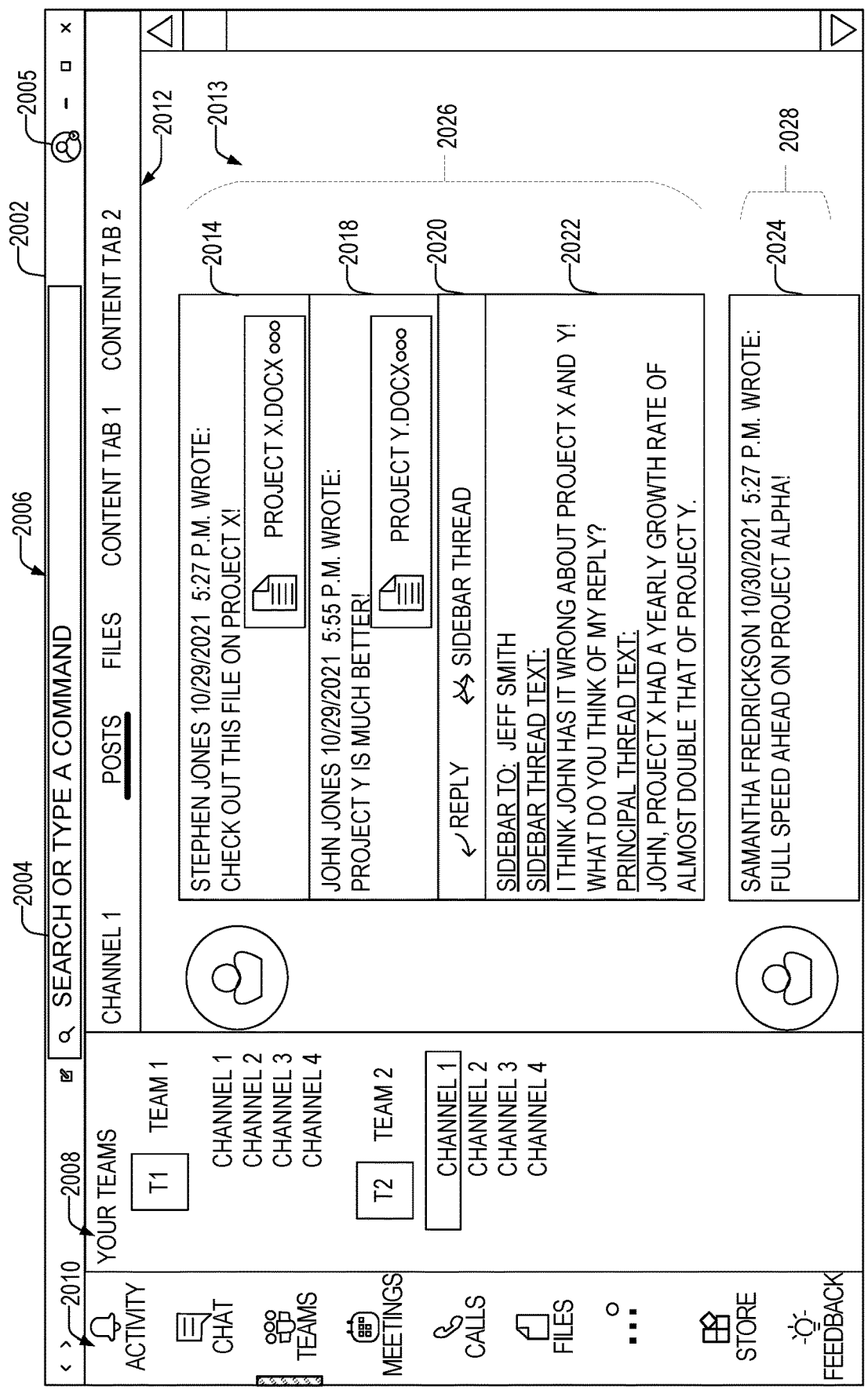
FIG. 20 illustrates a GUI of a unified communication platform and illustrates creation of a sidebar message that creates a sidebar thread according to some examples of the present disclosure.

FIG. 20 illustrates a GUI 2002 of a unified communication platform and illustrates creation of a sidebar message that creates a sidebar thread according to some examples of the present disclosure. The GUI 2002 includes a title bar 2006 with a search and command bar 2004 where users may search for matching communications, files, folders, and other content. Status icon 2005 shows a user's status and availability. Clicking or otherwise selecting the status icon allows users to set their status and availability as well as other account and application options. A function bar 2010 allows users to select various functions of the unified communication application; such as observing recent activity on the unified communication service related to the user; participating in one or more chat sessions; viewing one or more communication topic groups (called Teams), attending or scheduling online meetings, participating in one or more voice calls, viewing files shared within the unified communication service, accessing an add-on store which adds functionality to the unified communication service, providing feedback, and the like.

As shown in FIG. 20, the Teams function is selected and in the team selection bar 2008, the communication groups the user is subscribed to are shown. In the example of FIG. 20, the user is subscribed to two teams: team 1 and team 2. Communication topic groups may have sub-groups called channels for discussion of one or more sub-topics to the communication topic groups. In the Example of FIG. 20, there are two Teams, each with four channels. The Team selection bar 2008 allows users to select between the Teams to which the user is subscribed as well as the channels. In the Example of FIG. 20, the first Channel of the second Team is selected.

Each channel may in turn have multiple tabs which are selected through a tab selection bar 2012. Tabs may separate different types of content and communications as well as provide another way to organize a Channel. In the example shown in FIG. 20, the selected Channel has four tabs: Posts, Files, Content Tab 1, and Content Tab 2. The posts tab is selected. The tab area 2013 displays the contents of the selected Tab. In FIG. 20, this is a bulletin board for the Channel. The bulletin board includes posts organized by threads. Two threads are shown, a first thread 2026 comprising two posted posts, 2014, and 2018 and a third post that is being entered into sidebar thread message creation input area 2022. Second thread 2028 is shown with one post 2024, but additional posts may be part of the thread and accessible using the vertical scroll bar.

Posts may include one or more file attachments. At the bottom of a thread a user may reply to a post using the action bar 2020. Shown is a reply function and a sidebar thread function. In the example of FIG. 20, the user has activated the sidebar thread function and a sidebar thread message creation input area 2022 may be shown. The sidebar thread message creation input area 2022 may allow users to specify the sidebar thread participants ("sidebar to:"), sidebar thread messages ("sidebar thread text"), proposed principle thread text, and the like. The sidebar thread message creation input area 2022 may also allow users to specify a subset of the principle thread users that will see the proposed reply.

Figure 21:
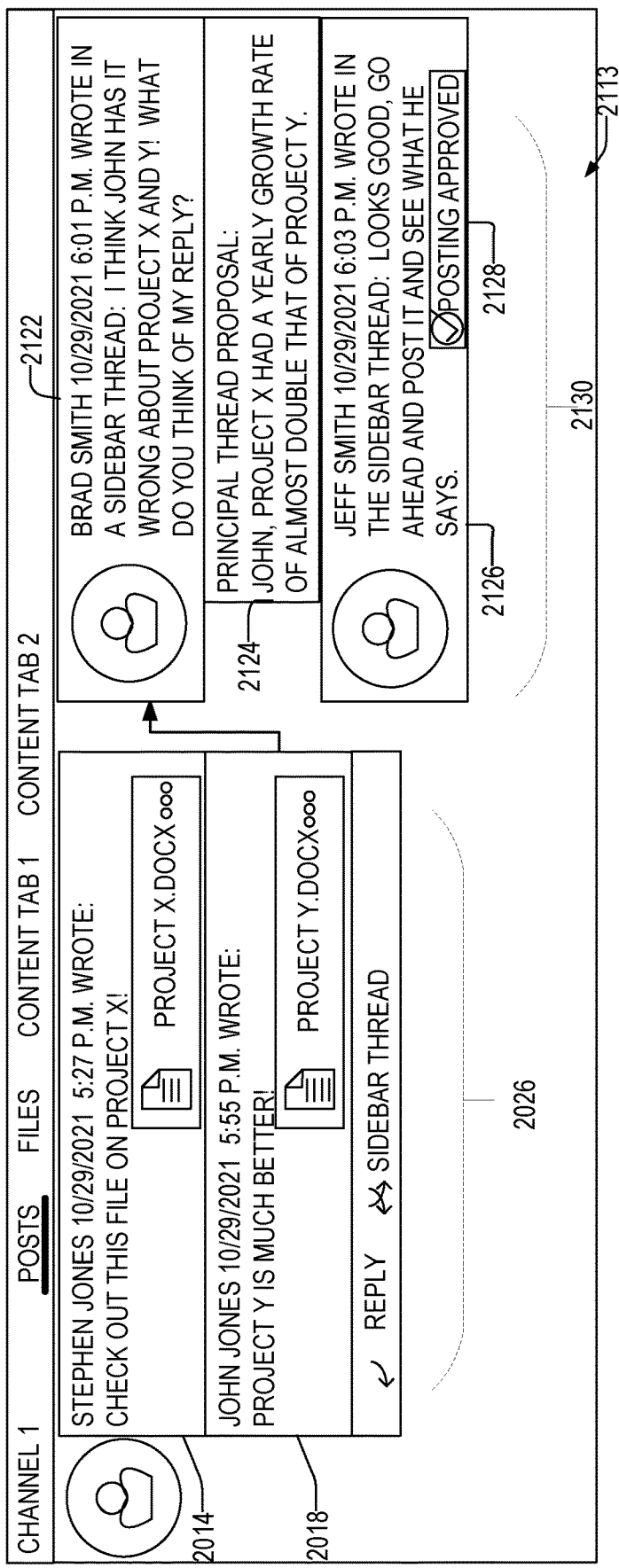
FIG. 21 illustrates a partial GUI of a unified communication application and illustrates a sidebar thread according to some examples of the present disclosure.

FIG. 21 illustrates a partial GUI 2112 of a unified communication application and illustrates a sidebar thread according to some examples of the present disclosure. FIG. 21 shows only the tab area 2113. Tab area 2113 may be the result of posting the sidebar message entered into the sidebar thread message creation input area 2022 of tab area 2013 of FIG. 20. The second thread 2028 is omitted in FIG. 21 for clarity. Sidebar thread 2130 may be set apart visually from the principal thread from which it was forked—namely thread 2026. In some examples, one or more visual connections (such as an arrow) indicates that it is a sidebar thread forked from a particular message of the principal thread. Sidebar message 2122 and proposed principal thread message 2124 may be displayed along with any sidebar thread reply messages, such as reply 2126. In some examples, edits to the proposed principal thread message 2124 may be posted as additional messages, or the proposed principal thread message 2124 may be edited inline. Sidebar thread participants may have one or more action icons (such as the action icons shown for the reply and sidebar thread). Upon approval, an icon, such as icon 2128 may be displayed in the approving user's post.

Figure 22:
FIG. 22 shows a partial GUI of a unified communication application according to some examples of the present disclosure.

FIG. 22 shows a partial GUI 2212 of a unified communication application according to some examples of the present disclosure. Like FIG. 21, FIG. 22 only illustrates the tab area 2213. The GUI 2212 shows the thread 2026 after the proposed principal thread message 2124 becomes the accepted principal thread message and is posted to the thread 2026 from the initiator of the sidebar thread (in the examples of FIG. 20-22, "Brad Smith"). Message 2260 is posted to thread 2026 as if it was from the initiator of the sidebar thread upon the system detecting the termination event that terminates the sidebar thread and approves the proposed principle thread message. In some examples, sidebar thread 2130 may remain visible for participants of sidebar thread 2130 after the sidebar thread termination event occurs. In other examples, the sidebar thread 2130 may remain visible to participants of the sidebar thread for a specified period of time after the termination event occurs and then disappears. In yet other examples, the sidebar thread may disappear for the participants of the sidebar thread once the termination event occurs. The sidebar thread 2130 is no longer displayed in FIG. 22. Participants in the thread 2026 who are not also participants of sidebar thread 2130 would not see sidebar thread 2130. To these participants, they would see messages 2014 and 2018 of thread 2026 and then when the sidebar thread terminates (with a posting to the principal thread), they would see message 2260.

Figure 23:
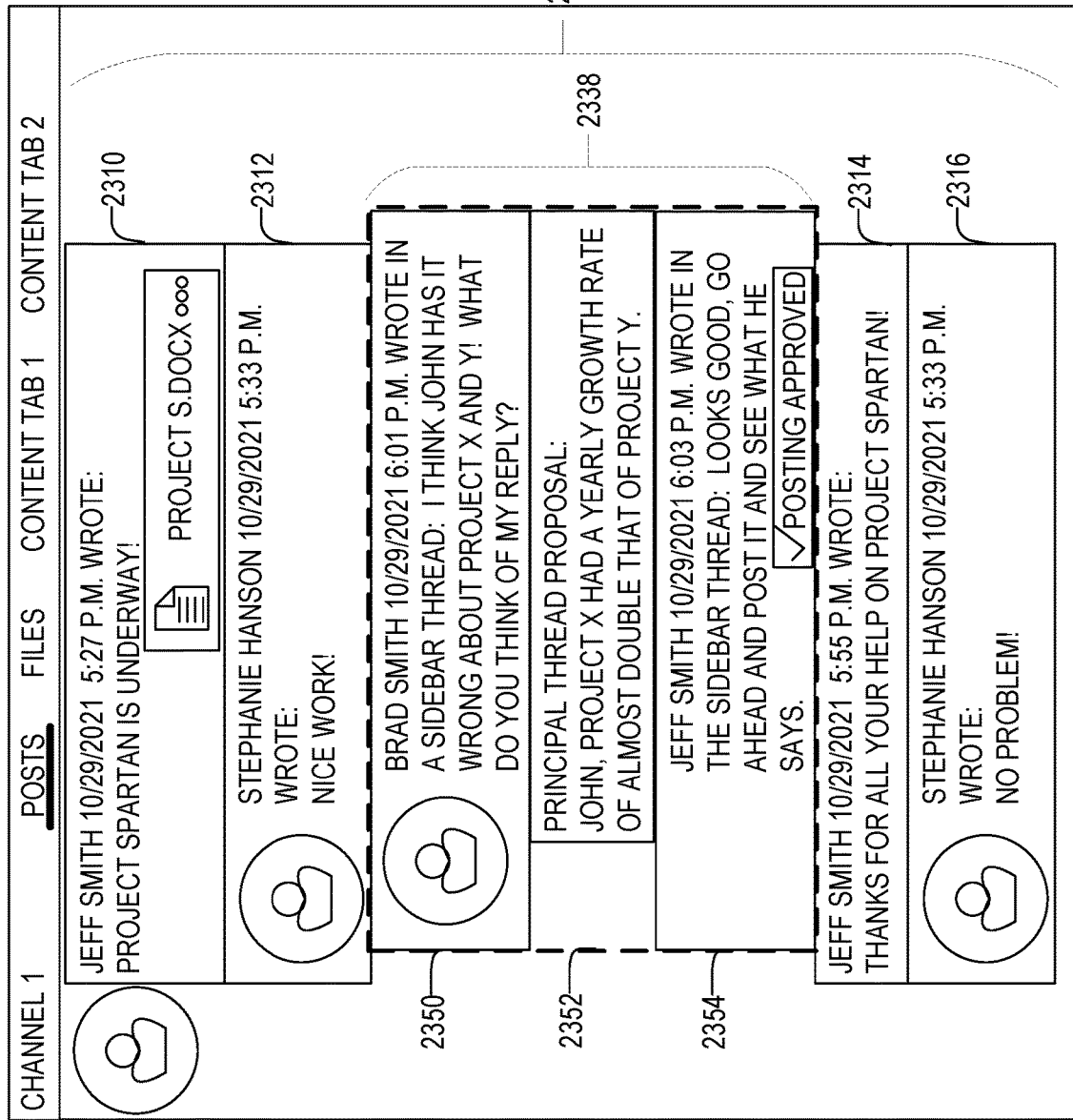
FIG. 23 shows a partial GUI of a unified communication application according to some examples of the present disclosure.

FIG. 23 shows a partial GUI of a unified communication application according to some examples of the present disclosure. Like FIGS. 21 and 22, FIG. 23 only illustrates the tab area 2313 of the unified communication application. FIG. 23 illustrates the example of FIG. 12 where a sidebar thread of a first thread is posted within a second thread. First thread 2330 includes messages 2310, 2312, 2314, and 2316. After message 2312, sidebar thread 2338 is created within the thread 2330. Sidebar thread may include messages 2350, 2352, and 2354. Sidebar thread 2338 may be posted as part of thread 2330. In some examples, and as shown, sidebar thread 2338 may be visually distinguished from the other posts of thread 2330. Once a sidebar thread termination event happens, the thread 2330 may continue. In some examples, the sidebar thread 2338 posts are removed from thread 2330 once the termination event occurs. In other examples, the sidebar thread posts are left within thread 2330. Sidebar thread 2338 may be considered a sub-thread or child thread of thread 2330.

GUIs from FIGS. 4-10 and 20-23 may be provided by a client communication application such as communication application 1655. In other examples, the communication service, such as communication service 1605 may provide these GUIs. For example, by providing data to the communication application 1655 to create these GUIs. In other examples, the communication service 1605 may provide these GUIs in the form of one or more GUI descriptors. GUI descriptors may be rendered or otherwise displayed by an application on a client device such as a browser. Example GUI descriptors may include HyperText Markup Language (HTML), Cascading Style Sheets (CSS), scripts, java, or other files.

As used herein, a message is "posted" to another message thread by causing it to be added to the thread by transmitting it or delivering it according to the communication modality of the thread. For example, a message may be posted by sending an email, posting it to a bulletin board, posting it to a message thread of a unified communication application, posting it to a chat room by sending a chat message, or the like.

Figure 24:
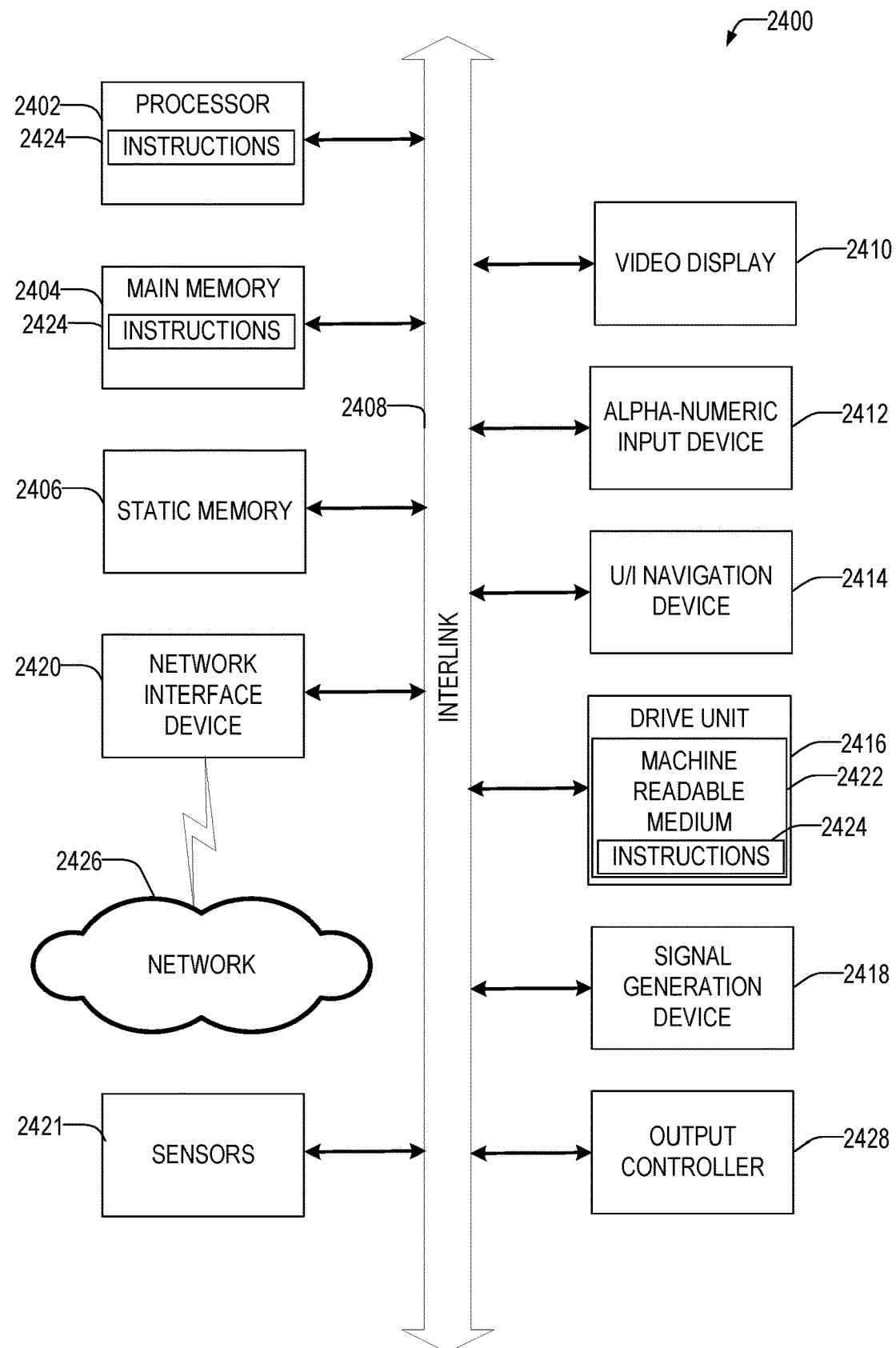
FIG. 24 is a block diagram illustrating an example of a machine upon which one or more embodiments may be implemented.

FIG. 24 illustrates a block diagram of an example machine 2400 upon which any one or more of the techniques (e.g., methodologies) discussed herein may be performed. In alternative embodiments, the machine 2400 may operate as a standalone device or may be connected (e.g., networked) to other machines. In a networked deployment, the machine 2400 may operate in the capacity of a server machine, a client machine, or both in server-client network environments. In an example, the machine 2400 may act as a peer machine in peer-to-peer (P2P) (or other distributed) network environment. The machine 2400 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 2400 may be configured to provide the communication threads shown in FIGS. 1-3,11, and 12; provide the GUIs of FIGS. 4-10; create, store, and manage the data structures of FIG. 13; be a communication server providing the communication service, be a user device of a user account shown in FIGS. 14 and 15; implement one or more components shown in FIG. 16; and implement the methods of FIGS. 17-19. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 2400 may include one or more hardware processors, such as processor 2402. Processor 2402 may be a central processing unit (CPU), a graphics processing unit (GPU), a hardware processor core, or any combination thereof. Machine 2400 may include a main memory 2404 and a static memory 2406, some or all of which may communicate with each other via an interlink (e.g., bus) 2408. Examples of main memory 2404 may include Synchronous Dynamic Random-Access Memory (SDRAM), such as Double Data Rate memory, such as DDR4 or DDR5. Interlink 2408 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 2400 may further include a display unit 2410, an alphanumeric input device 2412 (e.g., a keyboard), and a user interface (UI) navigation device 2414 (e.g., a mouse). In an example, the display unit 2410, input device 2412 and UI navigation device 2414 may be a touch screen display. The machine 2400 may additionally include a storage device (e.g., drive unit) 2416, a signal generation device 2418 (e.g., a speaker), a network interface device 2420, and one or more sensors 2421, such as a global positioning system (GPS) sensor, compass, accelerometer, or other sensor. The machine 2400 may include an output controller 2428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2416 may include a machine readable medium 2422 on which is stored one or more sets of data structures or instructions 2424 (e.g., software) embodying or utilized by any one or more of the techniques or functions described herein. The instructions 2424 may also reside, completely or at least partially, within the main memory 2404, within static memory 2406, or within the hardware processor 2402 during execution thereof by the machine 2400. In an example, one or any combination of the hardware processor 2402, the main memory 2404, the static memory 2406, or the storage device 2416 may constitute machine readable media.

While the machine readable medium 2422 is illustrated as a single medium, the term "machine readable medium" may include a single medium or multiple media (e.g., a centralized or distributed database, and/or associated caches and servers) configured to store the one or more instructions 2424.

The term "machine readable medium" may include any medium that is capable of storing, encoding, or carrying instructions for execution by the machine 2400 and that cause the machine 2400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 2424 may further be transmitted or received over a communications network 2426 using a transmission medium via the network interface device 2420. The Machine 2400 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 2420 may include one or more physical jacks (e.g., Ethernet, coaxial, or phone jacks) or one or more antennas to connect to the communications network 2426. In an example, the network interface device 2420 may include a plurality of antennas to wirelessly communicate using at least one of single-input multiple-output (SIMO), multiple-input multiple-output (MIMO), or multiple-input single-output (MISO) techniques. In some examples, the network interface device 2420 may wirelessly communicate using Multiple User MIMO techniques.

Other Notes and Examples

Example 1 is a method of providing a sidebar thread for a communication, the method comprising: using one or more processors of a communication server: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command, causing a notification of the sidebar thread to be sent over the communication network to the address of the sidebar recipient, the notification including the first message and a portion or a link to a portion of the first communication thread; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread.

In Example 2, the subject matter of Example 1 includes, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

In Example 3, the subject matter of Example 2 includes, wherein creating the communication message comprises excluding the plurality of sidebar thread message contents.

In Example 4, the subject matter of Examples 1-3 includes, wherein the notification of the sidebar thread includes a message history of a second communication thread, and wherein the method further comprises: identifying the second communication thread, the second communication thread different than the first communication thread and the sidebar thread; and posting the communication message to the second communication thread in addition to the posting the communication message to the final recipient from the address of the sender in the first communication thread.

In Example 5, the subject matter of Examples 1-4 includes, wherein posting the communication message to the final recipient from the address of the sender in the first communication thread comprises replying to a message in the first communication thread.

In Example 6, the subject matter of Example 5 includes, wherein the message in the first communication thread is a message that the sidebar thread was forked from.

In Example 7, the subject matter of Examples 5-6 includes, wherein the message in the first communication thread is a message in the first communication thread that was posted to the first communication thread after the sidebar thread was forked from the first communication thread.

In Example 8, the subject matter of Examples 1-7 includes, wherein the first communication thread is hosted by a first communication modality and the sidebar thread is hosted by a second communication modality.

In Example 9, the subject matter of Examples 1-8 includes, wherein the first communication thread and the sidebar thread are both one of an electronic mail (email) communication thread, a chat thread, a message board thread, a text message thread, or a thread from a unified communication application.

In Example 10, the subject matter of Examples 1-9 includes, wherein receiving the command comprises receiving an email and wherein posting the communication message comprises sending an email.

In Example 11, the subject matter of Examples 1-10 includes, wherein the final recipient is a participant of the first communication thread and wherein posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

In Example 12, the subject matter of Examples 1-11 includes, providing a graphical user interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

Example 13 is a computing device for providing a sidebar thread for a communication, the computing device comprising: a processor; a memory, storing instructions, which when executed by the processor cause the computing device to perform operations comprising: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command, causing a notification of the sidebar thread to be sent over the communication network to the address of the sidebar recipient, the notification including the first message and a portion or a link to a portion of the first communication thread; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread.

In Example 14, the subject matter of Example 13 includes, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

In Example 15, the subject matter of Example 14 includes, wherein the operation of creating the communication message comprises excluding the plurality of sidebar thread message contents.

In Example 16, the subject matter of Examples 13-15 includes, wherein the notification of the sidebar thread includes a message history of a second communication thread, and wherein the operations further comprise: identifying the second communication thread, the second communication thread different than the first communication thread and the sidebar thread; and posting the communication message to the second communication thread in addition to the posting the communication message to the final recipient from the address of the sender in the first communication thread.

In Example 17, the subject matter of Examples 13-16 includes, wherein the operation of posting the communication message to the final recipient from the address of the sender in the first communication thread comprises replying to a message in the first communication thread.

In Example 18, the subject matter of Example 17 includes, wherein the message in the first communication thread is a message that the sidebar thread was forked from.

In Example 19, the subject matter of Examples 17-18 includes, wherein the message in the first communication thread is a message in the first communication thread that was posted to the first communication thread after the sidebar thread was forked from the first communication thread.

In Example 20, the subject matter of Examples 13-19 includes, wherein the first communication thread is hosted by a first communication modality and the sidebar thread is hosted by a second communication modality.

In Example 21, the subject matter of Examples 13-20 includes, wherein the first communication thread and the sidebar thread are both one of an electronic mail (email) communication thread, a chat thread, a message board thread, a text message thread, or a thread from a unified communication application.

In Example 22, the subject matter of Examples 13-21 includes, wherein the operation of receiving the command comprises receiving an email and wherein posting the communication message comprises sending an email.

In Example 23, the subject matter of Examples 13-22 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

In Example 24, the subject matter of Examples 13-23 includes, providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein the operation of receiving the command is responsive to a selection of the creation control in the second GUI.

Example 25 is a machine-readable medium, storing instructions for providing a sidebar thread for a communication, the instructions, when executed by a machine, cause the machine to perform operations comprising: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command, causing a notification of the sidebar thread to be sent over the communication network to the address of the sidebar recipient, the notification including the first message and a portion or a link to a portion of the first communication thread; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread.

In Example 26, the subject matter of Example 25 includes, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

In Example 27, the subject matter of Example 26 includes, wherein the operation of creating the communication message comprises excluding the plurality of sidebar thread message contents.

In Example 28, the subject matter of Examples 25-27 includes, wherein the notification of the sidebar thread includes a message history of a second communication thread, and wherein the operations further comprise: identifying the second communication thread, the second communication thread different than the first communication thread and the sidebar thread; and posting the communication message to the second communication thread in addition to the posting the communication message to the final recipient from the address of the sender in the first communication thread.

In Example 29, the subject matter of Examples 25-28 includes, wherein the operation of posting the communication message to the final recipient from the address of the sender in the first communication thread comprises replying to a message in the first communication thread.

In Example 30, the subject matter of Example 29 includes, wherein the message in the first communication thread is a message that the sidebar thread was forked from.

In Example 31, the subject matter of Examples 29-30 includes, wherein the message in the first communication thread is a message in the first communication thread that was posted to the first communication thread after the sidebar thread was forked from the first communication thread.

In Example 32, the subject matter of Examples 25-31 includes, wherein the first communication thread is hosted by a first communication modality and the sidebar thread is hosted by a second communication modality.

In Example 33, the subject matter of Examples 25-32 includes, wherein the first communication thread and the sidebar thread are both one of an electronic mail (email) communication thread, a chat thread, a message board thread, a text message thread, or a thread from a unified communication application.

In Example 34, the subject matter of Examples 25-33 includes, wherein the operation of receiving the command comprises receiving an email and wherein posting the communication message comprises sending an email.

In Example 35, the subject matter of Examples 25-34 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

In Example 36, the subject matter of Examples 25-35 includes, providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein the operation of receiving the command is responsive to a selection of the creation control in the second GUI.

Example 37 is a device for providing a sidebar thread for a communication, the device comprising: means for receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; means for, responsive to receiving the command, causing a notification of the sidebar thread to be sent over the communication network to the address of the sidebar recipient, the notification including the first message and a portion or a link to a portion of the first communication thread; means for receiving an approval or a modification of the first message, over the communication network, from the sidebar recipient in the sidebar thread; responsive to receiving the approval or the modification of the first message, means for automatically: creating a communication message from an address of the sender addressed to the address of the final recipient by including the approved first message or the modification of the first message; and posting the communication message to the final recipient from the address of the sender in the first communication thread.

In Example 38, the subject matter of Example 37 includes, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

In Example 39, the subject matter of Example 38 includes, wherein the means for automatically creating the communication message comprises means for excluding the plurality of sidebar thread message contents.

In Example 40, the subject matter of Examples 37-39 includes, wherein the notification of the sidebar thread includes a message history of a second communication thread, and wherein the device further comprises: means for identifying the second communication thread, the second communication thread different than the first communication thread and the sidebar thread; and means for posting the communication message to the second communication thread in addition to the posting the communication message to the final recipient from the address of the sender in the first communication thread.

In Example 41, the subject matter of Examples 37-40 includes, wherein the posting the communication message to the final recipient from the address of the sender in the first communication thread comprises means for replying to a message in the first communication thread.

In Example 42, the subject matter of Example 41 includes, wherein the message in the first communication thread is a message that the sidebar thread was forked from.

In Example 43, the subject matter of Examples 41-42 includes, wherein the message in the first communication thread is a message in the first communication thread that was posted to the first communication thread after the sidebar thread was forked from the first communication thread.

In Example 44, the subject matter of Examples 37-43 includes, wherein the first communication thread is hosted by a first communication modality and the sidebar thread is hosted by a second communication modality.

In Example 45, the subject matter of Examples 37-44 includes, wherein the first communication thread and the sidebar thread are both one of an electronic mail (email) communication thread, a chat thread, a message board thread, a text message thread, or a thread from a unified communication application.

In Example 46, the subject matter of Examples 37-45 includes, wherein the means for receiving the command comprises means for receiving an email and wherein posting the communication message comprises sending an email.

In Example 47, the subject matter of Examples 37-46 includes, wherein the final recipient is a participant of the first communication thread and wherein the posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

In Example 48, the subject matter of Examples 37-47 includes, means for providing a Graphical User Interface (GUI) to the sender, the GUI displaying a message of the first communication thread and a selectable option to create the sidebar thread from the first communication thread; means for receiving an indication of a selection of the selectable option to create the sidebar thread; means for, responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

Example 49 is a method of providing a sidebar thread for a communication, the method comprising: using one or more processors of a communication server: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, an sidebar thread message, and an address of the sidebar recipient; responsive to receiving the command, causing a notification of the sidebar thread to be sent over the communication network to the address of the sidebar recipient, the notification including the first message and a portion or a link to a portion of the first communication thread and the sidebar thread message; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message and excluding the sidebar thread message; and posting the communication message to the final recipient from the address of the sender in the first communication thread.

In Example 50, the subject matter of Example 49 includes, identifying the first message or the modification of the first message using a natural language processing algorithm from communications of the sidebar thread.

In Example 51, the subject matter of Examples 49-50 includes, subsequent to the causing the notification of the sidebar thread to be sent over the communication network to the address of the sidebar recipient and prior to receiving the approval, receiving a command to post a message to the sidebar thread; and responsive to receiving the command to post the message to the sidebar thread, notifying participants of the sidebar thread of the message.

In Example 52, the subject matter of Examples 49-51 includes, identifying the first message or the modification of the first message using a data structure storing messages of the sidebar thread.

In Example 53, the subject matter of Examples 49-52 includes, wherein the first communication thread is hosted by a first communication modality and the sidebar thread is hosted by a second communication modality.

In Example 54, the subject matter of Examples 49-53 includes, wherein the first communication thread is an electronic mail (email) communication thread.

In Example 55, the subject matter of Examples 49-54 includes, wherein receiving the command comprises receiving an email and wherein posting the communication message comprises sending an email.

In Example 56, the subject matter of Examples 49-55 includes, wherein the sidebar thread is posted as a child thread of a second thread.

In Example 57, the subject matter of Examples 49-56 includes, wherein creating the communication message comprises excluding all messages from the sidebar thread aside from the first message.

In Example 58, the subject matter of Examples 49-57 includes, providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 59, the subject matter of Examples 49-58 includes, wherein the final recipient is a participant of the first communication thread and wherein the posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 60 is a computing device providing a sidebar thread for a communication, the computing device comprising: a processor; a memory, storing instructions, which when executed by the processor cause the computing device to perform operations comprising: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, an sidebar thread message, and an address of the sidebar recipient; responsive to receiving the command, causing a notification of the sidebar thread to be sent over the communication network to the address of the sidebar recipient, the notification including the first message and a portion or a link to a portion of the first communication thread and the sidebar thread message; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message and excluding the sidebar thread message; and posting the communication message to the final recipient from the address of the sender in the first communication thread.

In Example 61, the subject matter of Example 60 includes, wherein the operations further comprise: identifying the first message or the modification of the first message using a natural language processing algorithm from communications of the sidebar thread.

In Example 62, the subject matter of Examples 60-61 includes, wherein the operations further comprise: subsequent to the causing the notification of the sidebar thread to be sent over the communication network to the address of the sidebar recipient and prior to receiving the approval, receiving a command to post a message to the sidebar thread; and responsive to receiving the command to post the message to the sidebar thread, notifying participants of the sidebar thread of the message.

In Example 63, the subject matter of Examples 60-62 includes, wherein the operations further comprise: identifying the first message or the modification of the first message using a data structure storing messages of the sidebar thread.

In Example 64, the subject matter of Examples 60-63 includes, wherein the first communication thread is hosted by a first communication modality and the sidebar thread is hosted by a second communication modality.

In Example 65, the subject matter of Examples 60-64 includes, wherein the first communication thread is an electronic mail (email) communication thread.

In Example 66, the subject matter of Examples 60-65 includes, wherein receiving the command comprises receiving an email and wherein posting the communication message comprises sending an email.

In Example 67, the subject matter of Examples 60-66 includes, wherein the sidebar thread is posted as a child thread of a second thread.

In Example 68, the subject matter of Examples 60-67 includes, wherein the operation of creating the communication message comprises excluding all messages from the sidebar thread aside from the first message.

In Example 69, the subject matter of Examples 60-68 includes, wherein the operations further comprise: providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 70, the subject matter of Examples 60-69 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 71 is a machine-readable medium, storing instructions providing a sidebar thread for a communication, the instructions, which when executed by a machine, cause the machine to perform operations comprising: receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, an sidebar thread message, and an address of the sidebar recipient; responsive to receiving the command, causing a notification of the sidebar thread to be sent over the communication network to the address of the sidebar recipient, the notification including the first message and a portion or a link to a portion of the first communication thread and the sidebar thread message; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message and excluding the sidebar thread message; and posting the communication message to the final recipient from the address of the sender in the first communication thread.

In Example 72, the subject matter of Example 71 includes, wherein the operations further comprise: identifying the first message or the modification of the first message using a natural language processing algorithm from communications of the sidebar thread.

In Example 73, the subject matter of Examples 71-72 includes, wherein the operations further comprise: subsequent to the causing the notification of the sidebar thread to be sent over the communication network to the address of the sidebar recipient and prior to receiving the approval, receiving a command to post a message to the sidebar thread; and responsive to receiving the command to post the message to the sidebar thread, notifying participants of the sidebar thread of the message.

In Example 74, the subject matter of Examples 71-73 includes, wherein the operations further comprise: identifying the first message or the modification of the first message using a data structure storing messages of the sidebar thread.

In Example 75, the subject matter of Examples 71-74 includes, wherein the first communication thread is hosted by a first communication modality and the sidebar thread is hosted by a second communication modality.

In Example 76, the subject matter of Examples 71-75 includes, wherein the first communication thread is an electronic mail (email) communication thread.

In Example 77, the subject matter of Examples 71-76 includes, wherein receiving the command comprises receiving an email and wherein posting the communication message comprises sending an email.

In Example 78, the subject matter of Examples 71-77 includes, wherein the sidebar thread is posted as a child thread of a second thread.

In Example 79, the subject matter of Examples 71-78 includes, wherein the operation of creating the communication message comprises excluding all messages from the sidebar thread aside from the first message.

In Example 80, the subject matter of Examples 71-79 includes, wherein the operations further comprise: providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 81, the subject matter of Examples 71-80 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 82 is a device for providing a sidebar thread for a communication, the device comprising: means for receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, an sidebar thread message, and an address of the sidebar recipient; means for, responsive to receiving the command, causing a notification of the sidebar thread to be sent over the communication network to the address of the sidebar recipient, the notification including the first message and a portion or a link to a portion of the first communication thread and the sidebar thread message; means for receiving an approval or a modification of the first message, over the communication network, from the sidebar recipient in the sidebar thread; responsive to receiving the approval or the modification of the first message, means for automatically: creating a communication message from an address of the sender addressed to the address of the final recipient by including the approved first message or the modification of the first message and excluding the sidebar thread message; and posting the communication message to the final recipient from the address of the sender in the first communication thread.

In Example 83, the subject matter of Example 82 includes, means for identifying the first message or the modification of the first message using a natural language processing algorithm from communications of the sidebar thread.

In Example 84, the subject matter of Examples 82-83 includes, means for, subsequent to the causing the notification of the sidebar thread to be sent over the communication network to the address of the sidebar recipient and prior to receiving the approval, receiving a command to post a message to the sidebar thread; and means for responsive to receiving the command to post the message to the sidebar thread, notifying participants of the sidebar thread of the message.

In Example 85, the subject matter of Examples 82-84 includes, means for identifying the first message or the modification of the first message using a data structure storing messages of the sidebar thread.

In Example 86, the subject matter of Examples 82-85 includes, wherein the first communication thread is hosted by a first communication modality and the sidebar thread is hosted by a second communication modality.

In Example 87, the subject matter of Examples 82-86 includes, wherein the first communication thread is an electronic mail (email) communication thread.

In Example 88, the subject matter of Examples 82-87 includes, wherein the means for receiving the command comprises means for receiving an email and wherein posting the communication message comprises sending an email.

In Example 89, the subject matter of Examples 82-88 includes, wherein the sidebar thread is posted as a child thread of a second thread.

In Example 90, the subject matter of Examples 82-89 includes, wherein the means for creating the communication message comprises excluding all messages from the sidebar thread aside from the first message.

In Example 91, the subject matter of Examples 82-90 includes, means for providing a Graphical User Interface (GUI) to the sender, the GUI displaying a message of the first communication thread and a selectable option to create the sidebar thread from the first communication thread; means for receiving an indication of a selection of the selectable option to create the sidebar thread; means for, responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 92, the subject matter of Examples 82-91 includes, wherein the final recipient is a participant of the first communication thread and wherein the means for posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 93 is a method of providing a sidebar thread for a communication, the method comprising: using one or more processors of a communication server: receiving a command, over a communication network, from a sender, to create a sidebar thread forked from a specified message of a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command: causing a notification of the sidebar thread to be sent over the communication network to the address of the sidebar recipient, the notification including the first message and a portion or a link to a portion of the first communication thread; receiving an indication of a reply position in the first communication thread to post a reply; determining an identifier of the first communication thread using a thread identifier field in a data structure of the specified message of the first communication thread; searching a communication server data store to find a message data structure with a thread identifier field that matches the identifier of the first communication thread and that has a message index matching the reply position; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread as a reply to the message corresponding to the found message data structure, the message addressed to the final recipient and including at least a portion of a message body field of the message data structure.

In Example 94, the subject matter of Example 93 includes, wherein receiving the indication of the reply position in the first communication thread to post the reply comprises identifying a configured option and determining the reply position based upon the configured option and messages of the first communication thread.

In Example 95, the subject matter of Example 94 includes, wherein the configured option is set to a value indicating that the reply position is a last message in a thread, and wherein the reply position is determined based upon a last message in the first communication thread.

In Example 96, the subject matter of Examples 93-95 includes, wherein receiving an indication of a reply position in the first communication thread to post a reply comprises receiving a selection of a reply position in the first communication thread from a sidebar thread participant.

In Example 97, the subject matter of Example 96 includes, wherein the indication is part of the command.

In Example 98, the subject matter of Examples 96-97 includes, wherein the sidebar thread participant is the sender.

In Example 99, the subject matter of Examples 93-98 includes, wherein the sidebar thread comprises a plurality of communications prior to the approval or the modification of the first message.

In Example 100, the subject matter of Examples 93-99 includes, wherein the method further comprises: providing a graphical user interface (GUI) with a display of a plurality of messages in the first communication thread; and wherein receiving an indication of a reply position in the first communication thread to post a reply comprises receiving a selection of one of the plurality of messages in the first communication thread from the GUI.

In Example 101, the subject matter of Examples 93-100 includes, wherein the final recipient is a participant of the first communication thread and wherein posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 102 is a computing device for providing a sidebar thread for a communication, the computing device comprising: a processor; a memory, storing instructions, which when executed by the processor cause the computing device to perform operations comprising: receiving a command, over a communication network, from a sender, to create a sidebar thread forked from a specified message of a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command: causing a notification of the sidebar thread to be sent over the communication network to the address of the sidebar recipient, the notification including the first message and a portion or a link to a portion of the first communication thread; receiving an indication of a reply position in the first communication thread to post a reply; determining an identifier of the first communication thread using a thread identifier field in a data structure of the specified message of the first communication thread; searching a communication server data store to find a message data structure with a thread identifier field that matches the identifier of the first communication thread and that has a message index matching the reply position; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread as a reply to the message corresponding to the found message data structure, the message addressed to the final recipient and including at least a portion of a message body field of the message data structure.

In Example 103, the subject matter of Example 102 includes, wherein the operation of receiving the indication of the reply position in the first communication thread to post the reply comprises identifying a configured option and determining the reply position based upon the configured option and messages of the first communication thread.

In Example 104, the subject matter of Example 103 includes, wherein the configured option is set to a value indicating that the reply position is a last message in a thread, and wherein the operations comprise determining the reply position based upon a last message in the first communication thread.

In Example 105, the subject matter of Examples 102-104 includes, wherein the operation of receiving the indication of the reply position in the first communication thread to post a reply comprises receiving a selection of a reply position in the first communication thread from a sidebar thread participant.

In Example 106, the subject matter of Example 105 includes, wherein the indication is part of the command.

In Example 107, the subject matter of Examples 105-106 includes, wherein the sidebar thread participant is the sender.

In Example 108, the subject matter of Examples 102-107 includes, wherein the sidebar thread comprises a plurality of communications prior to the approval or the modification of the first message.

In Example 109, the subject matter of Examples 102-108 includes, wherein the operations further comprise: providing a graphical user interface (GUI) with a display of a plurality of messages in the first communication thread; and wherein receiving an indication of a reply position in the first communication thread to post a reply comprises receiving a selection of one of the plurality of messages in the first communication thread from the GUI.

In Example 110, the subject matter of Examples 102-109 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 111 is a machine-readable medium, storing instructions for providing a sidebar thread for a communication, the instructions, when executed by a machine, cause the machine to perform operations comprising: receiving a command, over a communication network, from a sender, to create a sidebar thread forked from a specified message of a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command: causing a notification of the sidebar thread to be sent over the communication network to the address of the sidebar recipient, the notification including the first message and a portion or a link to a portion of the first communication thread; receiving an indication of a reply position in the first communication thread to post a reply; determining an identifier of the first communication thread using a thread identifier field in a data structure of the specified message of the first communication thread; searching a communication server data store to find a message data structure with a thread identifier field that matches the identifier of the first communication thread and that has a message index matching the reply position; receiving an approval or a modification of the first message, over the communication network, from the sidebar recipient in the sidebar thread; responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread as a reply to the message corresponding to the found message data structure, the message addressed to the final recipient and including at least a portion of a message body field of the message data structure.

In Example 112, the subject matter of Example 111 includes, wherein the operation of receiving the indication of the reply position in the first communication thread to post the reply comprises identifying a configured option and determining the reply position based upon the configured option and messages of the first communication thread.

In Example 113, the subject matter of Example 112 includes, wherein the configured option is set to a value indicating that the reply position is a last message in a thread, and wherein the operations comprise determining the reply position based upon a last message in the first communication thread.

In Example 114, the subject matter of Examples 111-113 includes, wherein the operation of receiving the indication of the reply position in the first communication thread to post a reply comprises receiving a selection of a reply position in the first communication thread from a sidebar thread participant.

In Example 115, the subject matter of Example 114 includes, wherein the indication is part of the command.

In Example 116, the subject matter of Examples 114-115 includes, wherein the sidebar thread participant is the sender.

In Example 117, the subject matter of Examples 111-116 includes, wherein the sidebar thread comprises a plurality of communications prior to the approval or the modification of the first message.

In Example 118, the subject matter of Examples 111-117 includes, wherein the operations further comprise: providing a graphical user interface (GUI) with a display of a plurality of messages in the first communication thread; and wherein receiving an indication of a reply position in the first communication thread to post a reply comprises receiving a selection of one of the plurality of messages in the first communication thread from the GUI.

In Example 119, the subject matter of Examples 111-118 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 120 is a device for providing a sidebar thread for a communication, the device comprising: means for receiving a command, over a communication network, from a sender, to create a sidebar thread forked from a specified message of a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient; responsive to receiving the command: means for causing a notification of the sidebar thread to be sent over the communication network to the address of the sidebar recipient, the notification including the first message and a portion or a link to a portion of the first communication thread; means for receiving an indication of a reply position in the first communication thread to post a reply; means for determining an identifier of the first communication thread using a thread identifier field in a data structure of the specified message of the first communication thread; means for searching a communication server data store to find a message data structure with a thread identifier field that matches the identifier of the first communication thread and that has a message index matching the reply position; means for receiving an approval or a modification of the first message, over the communication network, from the sidebar recipient in the sidebar thread; means for, responsive to receiving the approval or the modification of the first message, automatically: creating a communication message from an address of the sender addressed to the address of the final recipient by including the approved first message or the modification of the first message; and posting the communication message to the final recipient from the address of the sender in the first communication thread as a reply to the message corresponding to the found message data structure, the message addressed to the final recipient and including at least a portion of a message body field of the message data structure.

In Example 121, the subject matter of Example 120 includes, wherein the means for receiving the indication of the reply position in the first communication thread to post the reply comprises means for identifying a configured option and determining the reply position based upon the configured option and messages of the first communication thread.

In Example 122, the subject matter of Example 121 includes, wherein the configured option is set to a value indicating that the reply position is a last message in a thread, and wherein the reply position is determined based upon a last message in the first communication thread.

In Example 123, the subject matter of Examples 120-122 includes, wherein the means for receiving an indication of a reply position in the first communication thread to post a reply comprises means for receiving a selection of a reply position in the first communication thread from a sidebar thread participant.

In Example 124, the subject matter of Example 123 includes, wherein the indication is part of the command.

In Example 125, the subject matter of Examples 123-124 includes, wherein the sidebar thread participant is the sender.

In Example 126, the subject matter of Examples 120-125 includes, wherein the sidebar thread comprises a plurality of communications prior to the approval or the modification of the first message.

In Example 127, the subject matter of Examples 120-126 includes, wherein the device further comprises: means for providing a graphical user interface (GUI) with a display of a plurality of messages in the first communication thread; and wherein the means for receiving an indication of a reply position in the first communication thread to post a reply comprises means for receiving a selection of one of the plurality of messages in the first communication thread from the GUI.

In Example 128, the subject matter of Examples 120-127 includes, wherein the final recipient is a participant of the first communication thread and wherein the means for posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 129 is a method of providing a sidebar thread for a communication, the method comprising: using one or more processors of a communication server: receiving a command, over a communication network, from a sender, to create a sidebar thread forked from a first communication thread, the first communication thread between a first plurality of participants including the sender, the sidebar thread being a thread between a second plurality of participants including the sender and a sidebar recipient, the command to create the sidebar thread including a first message, an address of a final recipient, and an address of the sidebar recipient; responsive to receiving the command: selecting a second communication thread based upon the sender being a common participant of the sidebar thread and the second communication thread, the second communication thread preexisting prior to the receipt of the command and including a third plurality of participants; posting a message to the second communication thread including the first message of the sidebar thread and including the second plurality of participants as members of the second communication thread; receiving an approval or a modification of the first message in the second communication thread over the communication network, from the third plurality of participants; responsive to receiving the approval or the modification of the first message, automatically: creating a communication message from an address of the sender to the final recipient, that includes, the first message or the modification of the first message; and posting the communication message to the final recipient from the address of the sender in the first communication thread.

In Example 130, the subject matter of Example 129 includes, wherein the first communication thread is provided over a first communication modality and the second communication thread is provided over a second communication modality.

In Example 131, the subject matter of Example 130 includes, wherein the first communication modality is one of: electronic mail or instant messaging and the second communication modality is the other of the electronic mail or instant messaging.

In Example 132, the subject matter of Examples 129-131 includes, wherein the first communication thread and the second communication thread are both provided over a same communication modality.

In Example 133, the subject matter of Examples 129-132 includes, wherein selecting the second communication thread comprises selecting the second communication thread also based upon a similarity in a subject of the first communication thread and either the second communication thread or the sidebar communication thread.

In Example 134, the subject matter of Examples 129-133 includes, wherein a participant of the sidebar thread is added to the second communication thread.

In Example 135, the subject matter of Examples 129-134 includes, wherein selecting the second communication thread based upon the sender being the common participant of the sidebar thread and the second communication thread comprises also selecting the second communication thread based upon a textual similarity metric of messages of the second communication thread and the sidebar thread.

In Example 136, the subject matter of Example 135 includes, determining the similarity metric using a natural language processing algorithm.

In Example 137, the subject matter of Example 136 includes, determining the similarity metric using text string matching.

In Example 138, the subject matter of Examples 129-137 includes, wherein posting a message to the second communication thread including the first message of the sidebar thread and including the second plurality of participants as members of the second communication thread comprises one of: sending an email with the message, posting the message in a chat room, posting the message in a discussion forum, or posting the message as part of a group discussion in a unified communications service.

In Example 139, the subject matter of Examples 129-138 includes, providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread;

and wherein receiving the command is responsive to a selection of the creation control in the second GUI.

In Example 140, the subject matter of Examples 129-139 includes, providing a GUI to the sender with GUI elements providing the sender with a choice to post the sidebar thread in the second communication thread or start a new thread; and wherein posting the message to the second communication thread is responsive to a receipt of a selection in the GUI to post the sidebar thread in the second communication thread.

In Example 141, the subject matter of Examples 129-140 includes, wherein the final recipient is a participant of the first communication thread and wherein posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 142 is a computing device for providing a sidebar thread for a communication, the computing device comprising: a processor; a memory, storing instructions, which when executed by the processor cause the computing device to perform operations comprising: receiving a command, over a communication network, from a sender, to create a sidebar thread forked from a first communication thread, the first communication thread between a first plurality of participants including the sender, the sidebar thread being a thread between a second plurality of participants including the sender and a sidebar recipient, the command to create the sidebar thread including a first message, an address of a final recipient, and an address of the sidebar recipient; responsive to receiving the command: selecting a second communication thread based upon the sender being a common participant of the sidebar thread and the second communication thread, the second communication thread preexisting prior to the receipt of the command and including a third plurality of participants; posting a message to the second communication thread including the first message of the sidebar thread and including the second plurality of participants as members of the second communication thread; receiving an approval or a modification of the first message in the second communication thread over the communication network, from the third plurality of participants; responsive to receiving the approval or the modification of the first message, automatically: creating a communication message from an address of the sender to the final recipient, that includes, the first message or the modification of the first message; and posting the communication message to the final recipient from the address of the sender in the first communication thread.

In Example 143, the subject matter of Example 142 includes, wherein the first communication thread is provided over a first communication modality and the second communication thread is provided over a second communication modality.

In Example 144, the subject matter of Example 143 includes, wherein the first communication modality is one of: electronic mail or instant messaging and the second communication modality is the other of the electronic mail or instant messaging.

In Example 145, the subject matter of Examples 142-144 includes, wherein the first communication thread and the second communication thread are both provided over a same communication modality.

In Example 146, the subject matter of Examples 142-145 includes, wherein the operation of selecting the second communication thread comprises selecting the second communication thread also based upon a similarity in a subject of the first communication thread and either the second communication thread or the sidebar thread.

In Example 147, the subject matter of Examples 142-146 includes, wherein a participant of the sidebar thread is added to the second communication thread.

In Example 148, the subject matter of Examples 142-147 includes, wherein the operation of selecting the second communication thread based upon the sender being the common participant of the sidebar thread and the second communication thread comprises also selecting the second communication thread based upon a textual similarity metric of messages of the second communication thread and the sidebar thread.

In Example 149, the subject matter of Example 148 includes, wherein the operations further comprise determining the similarity metric using a natural language processing algorithm.

In Example 150, the subject matter of Example 149 includes, wherein the operations further comprise determining the similarity metric using text string matching.

In Example 151, the subject matter of Examples 142-150 includes, wherein the operation of posting a message to the second communication thread including the first message of the sidebar thread and including the second plurality of participants as members of the second communication thread comprises one of: sending an email with the message, posting the message in a chat room, posting the message in a discussion forum, or posting the message as part of a group discussion in a unified communications service.

In Example 152, the subject matter of Examples 142-151 includes, wherein the operations further comprise: providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 153, the subject matter of Examples 142-152 includes, wherein the operations further comprise: providing a GUI to the sender with GUI elements providing the sender with a choice to post the sidebar thread in the second communication thread or start a new thread; and wherein posting the message to the second communication thread is responsive to a receipt of a selection in the GUI to post the sidebar thread in the second communication thread.

In Example 154, the subject matter of Examples 142-153 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of:

emailing the communication message, posting the communication to a chat session, posting the communication message to a message board, or posting the communication message to a group of a unified communication service.

Example 155 is a machine-readable medium, storing instructions for providing a sidebar thread for a communication, the instructions, when executed by a machine, cause the machine to perform operations comprising: receiving a command, over a communication network, from a sender, to create a sidebar thread forked from a first communication thread, the first communication thread between a first plurality of participants including the sender, the sidebar thread being a thread between a second plurality of participants including the sender and a sidebar recipient, the command to create the sidebar thread including a first message, an address of a final recipient, and an address of the sidebar recipient; responsive to receiving the command: selecting a second communication thread based upon the sender being a common participant of the sidebar thread and the second communication thread, the second communication thread preexisting prior to the receipt of the command and including a third plurality of participants; posting a message to the second communication thread including the first message of the sidebar thread and including the second plurality of participants as members of the second communication thread; receiving an approval or a modification of the first message in the second communication thread over the communication network, from the third plurality of participants; responsive to receiving the approval or the modification of the first message, automatically: creating a communication message from an address of the sender to the final recipient, that includes, the first message or the modification of the first message; and posting the communication message to the final recipient from the address of the sender in the first communication thread.

In Example 156, the subject matter of Example 155 includes, wherein the first communication thread is provided over a first communication modality and the second communication thread is provided over a second communication modality.

In Example 157, the subject matter of Example 156 includes, wherein the first communication modality is one of: electronic mail or instant messaging and the second communication modality is the other of the electronic mail or instant messaging.

In Example 158, the subject matter of Examples 155-157 includes, wherein the first communication thread and the second communication thread are both provided over a same communication modality.

In Example 159, the subject matter of Examples 155-158 includes, wherein the operation of selecting the second communication thread comprises selecting the second communication thread also based upon a similarity in a subject of the first communication thread and either the second communication thread or the sidebar thread.

In Example 160, the subject matter of Examples 155-159 includes, wherein a participant of the sidebar thread is added to the second communication thread.

In Example 161, the subject matter of Examples 155-160 includes, wherein the operation of selecting the second communication thread based upon the sender being the common participant of the sidebar thread and the second communication thread comprises also selecting the second communication thread based upon a textual similarity metric of messages of the second communication thread and the sidebar thread.

In Example 162, the subject matter of Example 161 includes, wherein the operations further comprise determining the similarity metric using a natural language processing algorithm.

In Example 163, the subject matter of Example 162 includes, wherein the operations further comprise determining the similarity metric using text string matching.

In Example 164, the subject matter of Examples 155-163 includes, wherein the operation of posting a message to the second communication thread including the first message of the sidebar thread and including the second plurality of participants as members of the second communication thread comprises one of: sending an email with the message, posting the message in a chat room, posting the message in a discussion forum, or posting the message as part of a group discussion in a unified communications service.

In Example 165, the subject matter of Examples 155-164 includes, wherein the operations further comprise: providing a Graphical User Interface (GUI) to the sender, the GUI displaying a message of the first communication thread and a selectable option to create the sidebar thread from the first communication thread; receiving an indication of a selection of the selectable option to create the sidebar thread; responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 166, the subject matter of Examples 155-165 includes, wherein the operations further comprise: providing a GUI to the sender with GUI elements providing the sender with a choice to post the sidebar thread in the second communication thread or start a new thread; and wherein posting the message to the second communication thread is responsive to a receipt of a selection in the GUI to post the sidebar thread in the second communication thread.

In Example 167, the subject matter of Examples 155-166 includes, wherein the final recipient is a participant of the first communication thread and wherein the operation of posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

Example 168 is a device for providing a sidebar thread for a communication, the device comprising: means for receiving a command, over a communication network, from a sender, to create a sidebar thread forked from a first communication thread, the first communication thread between a first plurality of participants including the sender, the sidebar thread being a thread between a second plurality of participants including the sender and a sidebar recipient, the command to create the sidebar thread including a first message, an address of a final recipient, and an address of the sidebar recipient; responsive to receiving the command: means for selecting a second communication thread based upon the sender being a common participant of the sidebar thread and the second communication thread, the second communication thread preexisting prior to the receipt of the command and including a third plurality of participants; means for posting a message to the second communication thread including the first message of the sidebar thread and including the second plurality of participants as members of the second communication thread; means for receiving an approval or a modification of the first message in the second communication thread over the communication network, from the third plurality of participants; means for, responsive to receiving the approval or the modification of the first message, automatically: creating a communication message from an address of the sender to the final recipient, that includes, the first message or the modification of the first message; and posting the communication message to the final recipient from the address of the sender in the first communication thread.

In Example 169, the subject matter of Example 168 includes, wherein the first communication thread is provided over a first communication modality and the second communication thread is provided over a second communication modality.

In Example 170, the subject matter of Example 169 includes, wherein the first communication modality is one of: electronic mail or instant messaging and the second communication modality is the other of the electronic mail or instant messaging.

In Example 171, the subject matter of Examples 168-170 includes, wherein the first communication thread and the second communication thread are both provided over a same communication modality.

In Example 172, the subject matter of Examples 168-171 includes, wherein the means for selecting the second communication thread comprises means for selecting the second communication thread also based upon a similarity in a subject of the first communication thread and either the second communication thread or the sidebar thread.

In Example 173, the subject matter of Examples 168-172 includes, wherein a participant of the sidebar thread is added to the second communication thread.

In Example 174, the subject matter of Examples 168-173 includes, wherein the means for selecting the second communication thread based upon the sender being the common participant of the sidebar thread and the second communication thread comprises also means for selecting the second communication thread based upon a textual similarity metric of messages of the second communication thread and the sidebar thread.

In Example 175, the subject matter of Example 174 includes, determining the similarity metric using a natural language processing algorithm.

In Example 176, the subject matter of Example 175 includes, determining the similarity metric using text string matching.

In Example 177, the subject matter of Examples 168-176 includes, wherein the means for posting the message to the second communication thread including the first message of the sidebar thread and including the second plurality of participants as members of the second communication thread comprises one of: sending an email with the message, posting the message in a chat room, posting the message in a discussion forum, or posting the message as part of a group discussion in a unified communications service.

In Example 178, the subject matter of Examples 168-177 includes, means for providing a Graphical User Interface (GUI) to the sender, the GUI displaying a message of the first communication thread and a selectable option to create the sidebar thread from the first communication thread; means for receiving an indication of a selection of the selectable option to create the sidebar thread; means for, responsive to the selection of the selectable option, providing a second GUI to the sender, the second GUI providing GUI controls that accept a designation of the sidebar recipient, a designation of the final recipient, the first message, and a creation control to create the sidebar thread; and wherein receiving the command is responsive to a selection of the creation control in the second GUI.

In Example 179, the subject matter of Examples 168-178 includes, means for providing a GUI to the sender with GUI elements providing the sender with a choice to post the sidebar thread in the second communication thread or start a new thread; and wherein posting the message to the second communication thread is responsive to a receipt of a selection in the GUI to post the sidebar thread in the second communication thread.

In Example 180, the subject matter of Examples 168-179 includes, wherein the final recipient is a participant of the first communication thread and wherein the means for posting the communication message to the final recipient from the address of the sender in the first communication thread comprises means for posting the communication message to the final recipient and all the other participants of the first communication thread, the posting comprising one of: emailing the communication message, posting the communication to a chat session, posting the communication message to a message board, or posting the communication message to a group of a unified communication service.

Example 181 is at least one machine-readable medium including instructions that, when executed by processing circuitry, cause the processing circuitry to perform operations to implement of any of Examples 1-180.

Example 182 is an apparatus comprising means to implement of any of Examples 1-180.

Example 183 is a system to implement of any of Examples 1-180.

Example 184 is a method to implement of any of Examples 1-180.

What is claimed is:

1. A method of providing a sidebar thread for a communication, the method comprising:
using one or more processors of a communication server:
receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient;
responsive to receiving the command, causing a notification of the sidebar thread to be sent over the communication network to the address of the sidebar recipient, the notification including the first message and a portion or a link to a portion of the first communication thread;
receiving an approval or a modification of the first message, over the communication network, from the sidebar recipient in the sidebar thread;
responsive to receiving the approval or the modification of the first message, automatically:
creating a communication message from an address of the sender addressed to the address of the final recipient by including the approved first message or the modification of the first message; and posting the communication message to the final recipient from the address of the sender in the first communication thread.

2. The method of claim 1, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

3. The method of claim 2, wherein creating the communication message comprises excluding the plurality of sidebar thread message contents.

4. The method of claim 1, wherein the notification of the sidebar thread includes a message history of a second communication thread, and wherein the method further comprises:
identifying the second communication thread, the second communication thread different than the first communication thread and the sidebar thread; and
posting the communication message to the second communication thread in addition to the posting the communication message to the final recipient from the address of the sender in the first communication thread.

5. The method of claim 1, wherein posting the communication message to the final recipient from the address of the sender in the first communication thread comprises replying to a message in the first communication thread.

6. The method of claim 5, wherein the message in the first communication thread is a message that the sidebar thread was forked from.

7. The method of claim 5, wherein the message in the first communication thread is a message in the first communication thread that was posted to the first communication thread after the sidebar thread was forked from the first communication thread.

8. The method of claim 1, wherein the first communication thread is hosted by a first communication modality and the sidebar thread is hosted by a second communication modality.

9. The method of claim 1, wherein the first communication thread and the sidebar thread are both one of an electronic mail (email) communication thread, a chat thread, a message board thread, a text message thread, or a thread from a unified communication application.

10. The method of claim 1, wherein receiving the command comprises receiving an email and wherein posting the communication message comprises sending an email.

11. The method of claim 1, wherein the final recipient is a participant of the first communication thread and wherein posting the communication message to the final recipient from the address of the sender in the first communication thread comprises posting the communication message to the final recipient and all the other participants of the first communication thread, the posting comprising one of: emailing the communication message, posting the communication to a chat session, posting the communication message to a message board, or posting the communication message to a group of a unified communication service.

12. The method of claim 1, further comprising:
providing a graphical user interface (GUI) to the sender, the GUI displaying a message of the first communication thread and a selectable option to create the sidebar thread from the first communication thread;
receiving an indication of a selection of the selectable option to create the sidebar thread;
responsive to the selection of the selectable option, providing a second GUI to the sender, the second GUI providing GUI controls that accept a designation of the sidebar recipient, a designation of the final recipient, the first message, and a creation control to create the sidebar thread; and
wherein receiving the command is responsive to a selection of the creation control in the second GUI.

13. A computing device for providing a sidebar thread for a communication, the computing device comprising:
a processor;
a memory, storing instructions, which when executed by the processor cause the computing device to perform operations comprising:
receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient;
responsive to receiving the command, causing a notification of the sidebar thread to be sent over the communication network to the address of the sidebar recipient, the notification including the first message and a portion or a link to a portion of the first communication thread;
receiving an approval or a modification of the first message, over the communication network, from the sidebar recipient in the sidebar thread;
responsive to receiving the approval or the modification of the first message, automatically:
creating a communication message from an address of the sender addressed to the address of the final recipient by including the approved first message or the modification of the first message; and
posting the communication message to the final recipient from the address of the sender in the first communication thread.

14. The computing device of claim 13, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

15. The computing device of claim 14, wherein the operation of creating the communication message comprises excluding the plurality of sidebar thread message contents.

16. The computing device of claim 13, wherein the notification of the sidebar thread includes a message history of a second communication thread, and wherein the operations further comprise:
identifying the second communication thread, the second communication thread different than the first communication thread and the sidebar thread; and
posting the communication message to the second communication thread in addition to the posting the communication message to the final recipient from the address of the sender in the first communication thread.

17. The computing device of claim 13, wherein the operation of posting the communication message to the final recipient from the address of the sender in the first communication thread comprises replying to a message in the first communication thread.

18. A device for providing a sidebar thread for a communication, the device comprising:

means for receiving a command, over a communication network, from a sender, to create a sidebar thread forked from a first communication thread, the first communication thread between a first plurality of first communication thread participants including the sender, the sidebar thread being a thread between a second plurality of sidebar thread participants including the sender and a sidebar recipient, the command to create the sidebar thread including a first message, an address of a final recipient, and an address of the sidebar recipient;

means for, responsive to receiving the command, causing a notification of the sidebar thread to be sent over the communication network to the address of the sidebar recipient, the notification including the first message and a portion or a link to a portion of the first communication thread;

means for receiving an approval or a modification of the first message, over the communication network, from the sidebar recipient in the sidebar thread;

responsive to receiving the approval or the modification of the first message, means for automatically:

creating a communication message from an address of the sender addressed to the address of the final recipient by including the approved first message or the modification of the first message; and posting the communication message to the final recipient from the address of the sender in the first communication thread.

19. The device of claim 18, wherein the sidebar thread comprises a plurality of sidebar communications in the sidebar thread between sidebar thread participants prior to the receipt of the approval or the modification of the first message, the plurality of sidebar communications including a plurality of sidebar thread message contents that are not the first message or a modification of the first message.

20. The device of claim 19, wherein the means for automatically creating the communication message comprises means for excluding the plurality of sidebar thread message contents.

* * * * *